May 2, 1961 W. F. RICHARDSON ET AL 2,982,317
MACHINE FOR MANUFACTURING REINFORCED FABRICS
Filed July 7, 1953 13 Sheets-Sheet 3

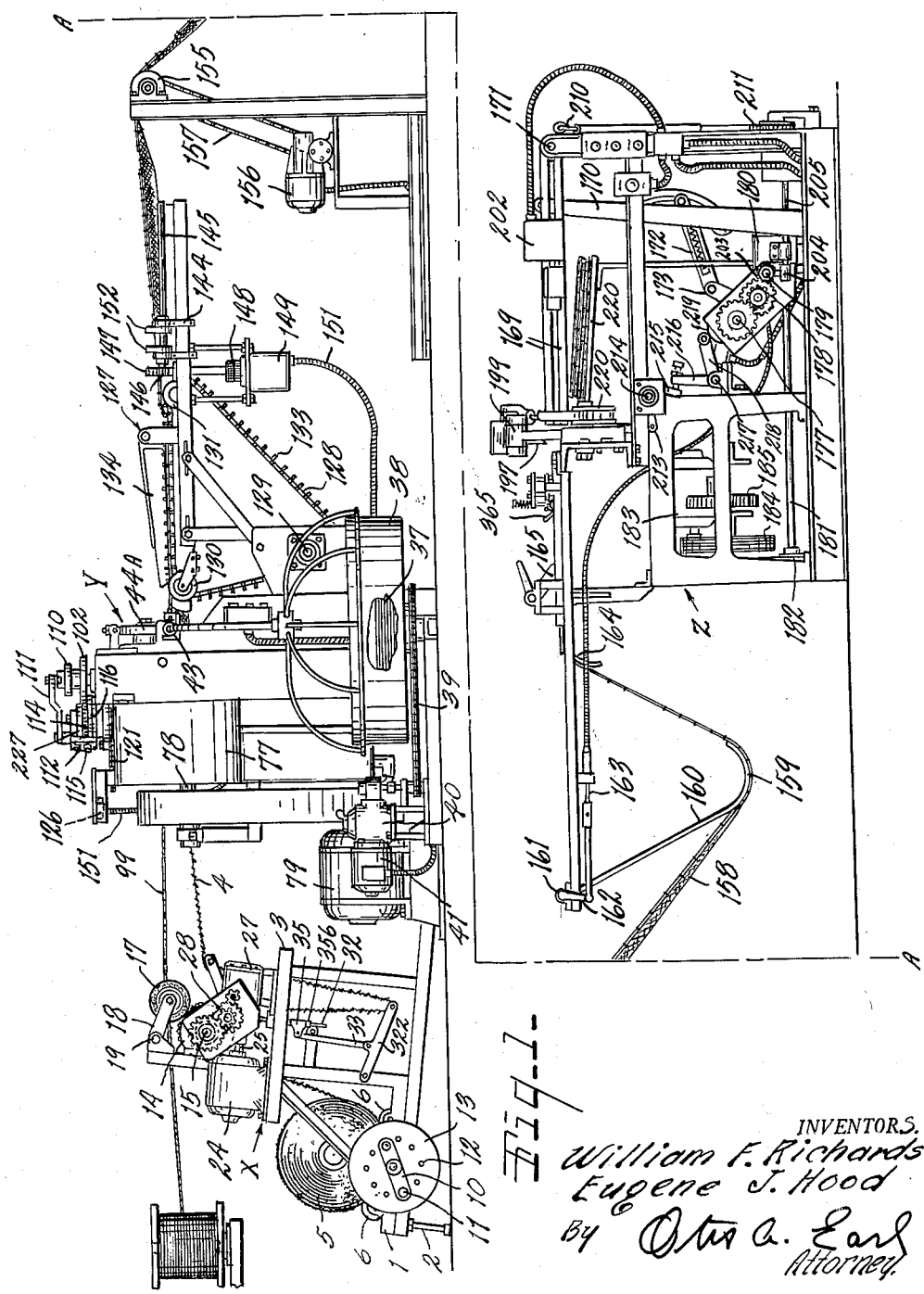

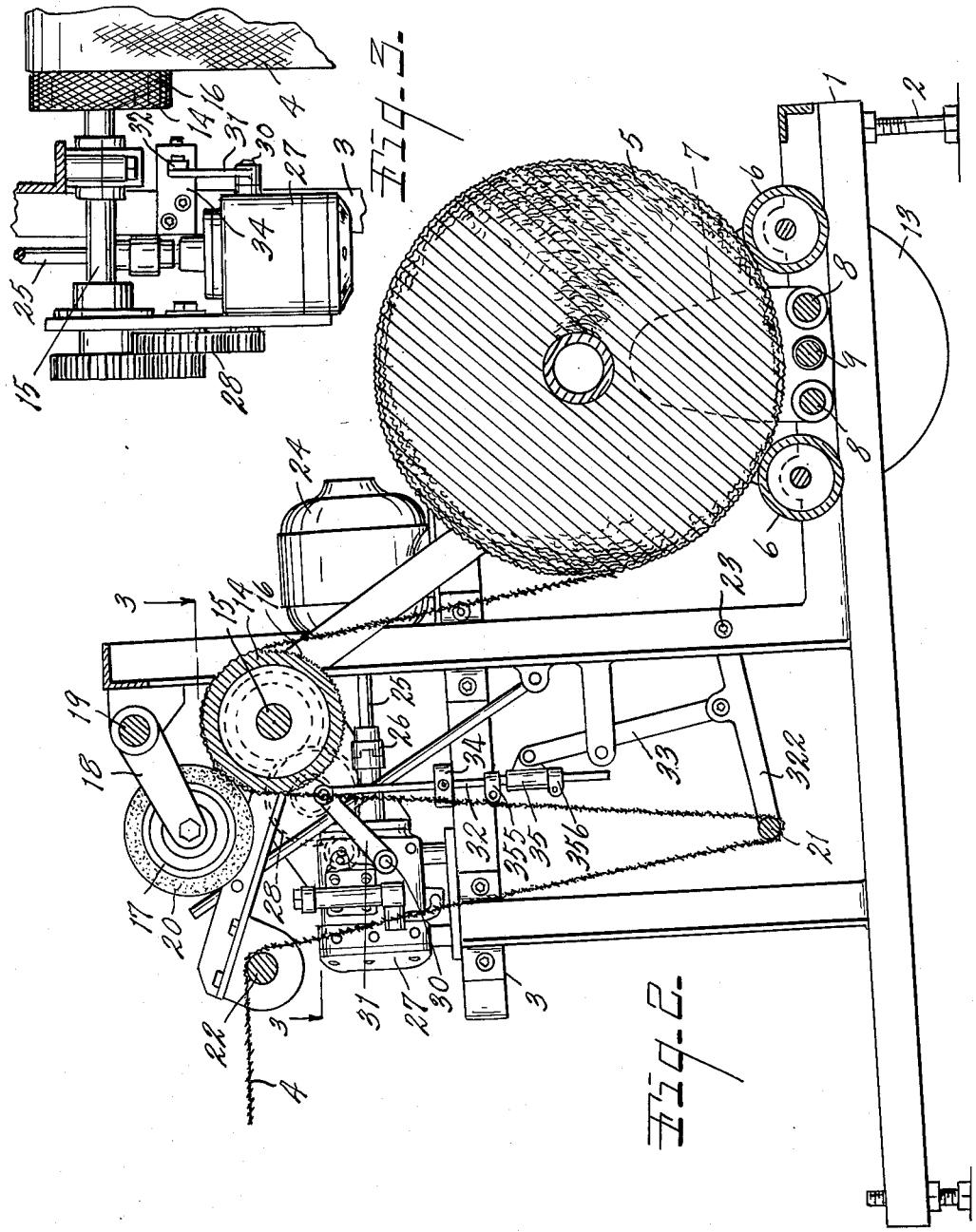

INVENTORS.
William F. Richardson
Eugene J. Hood
BY Otto A. Earl
Attorney.

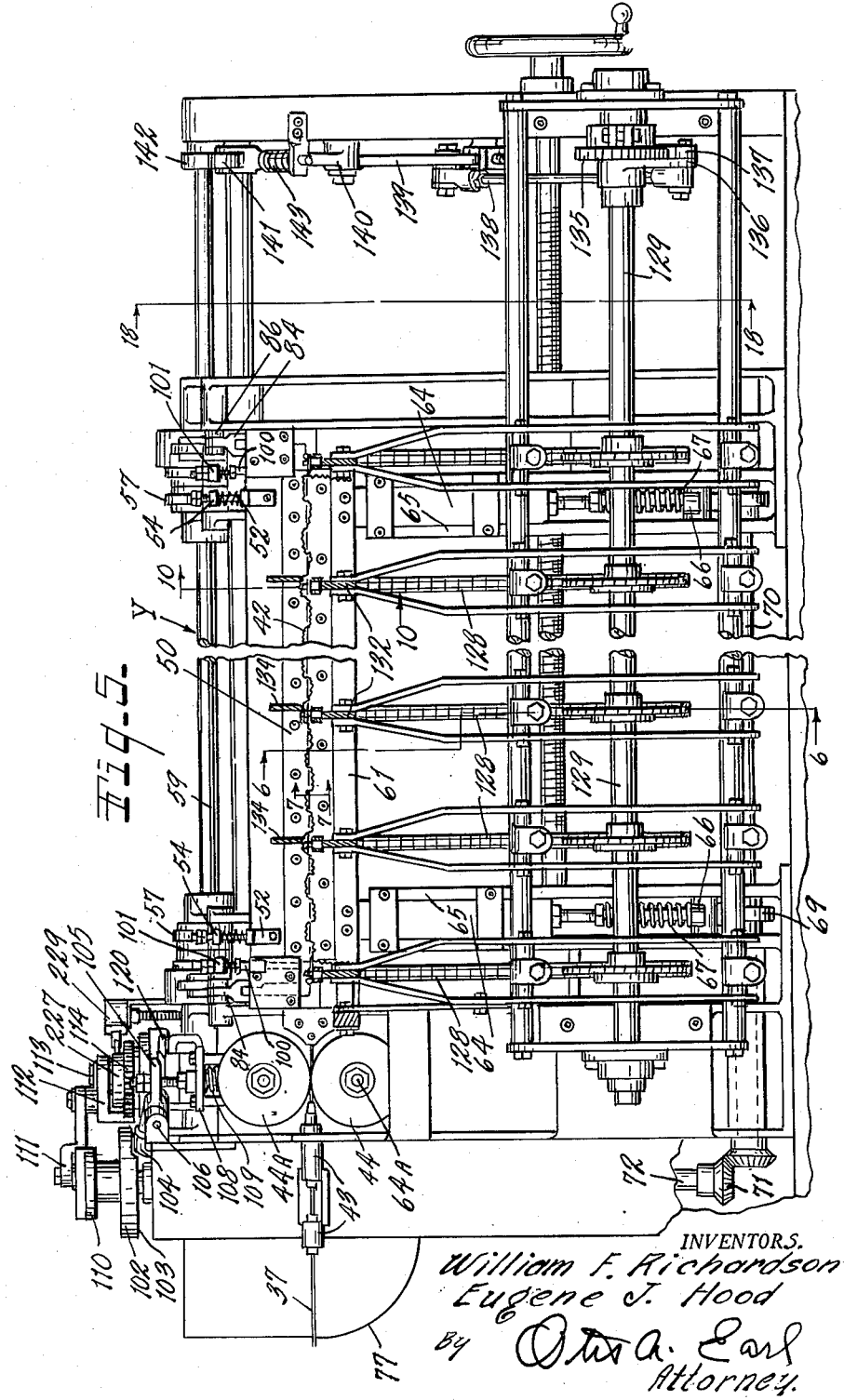

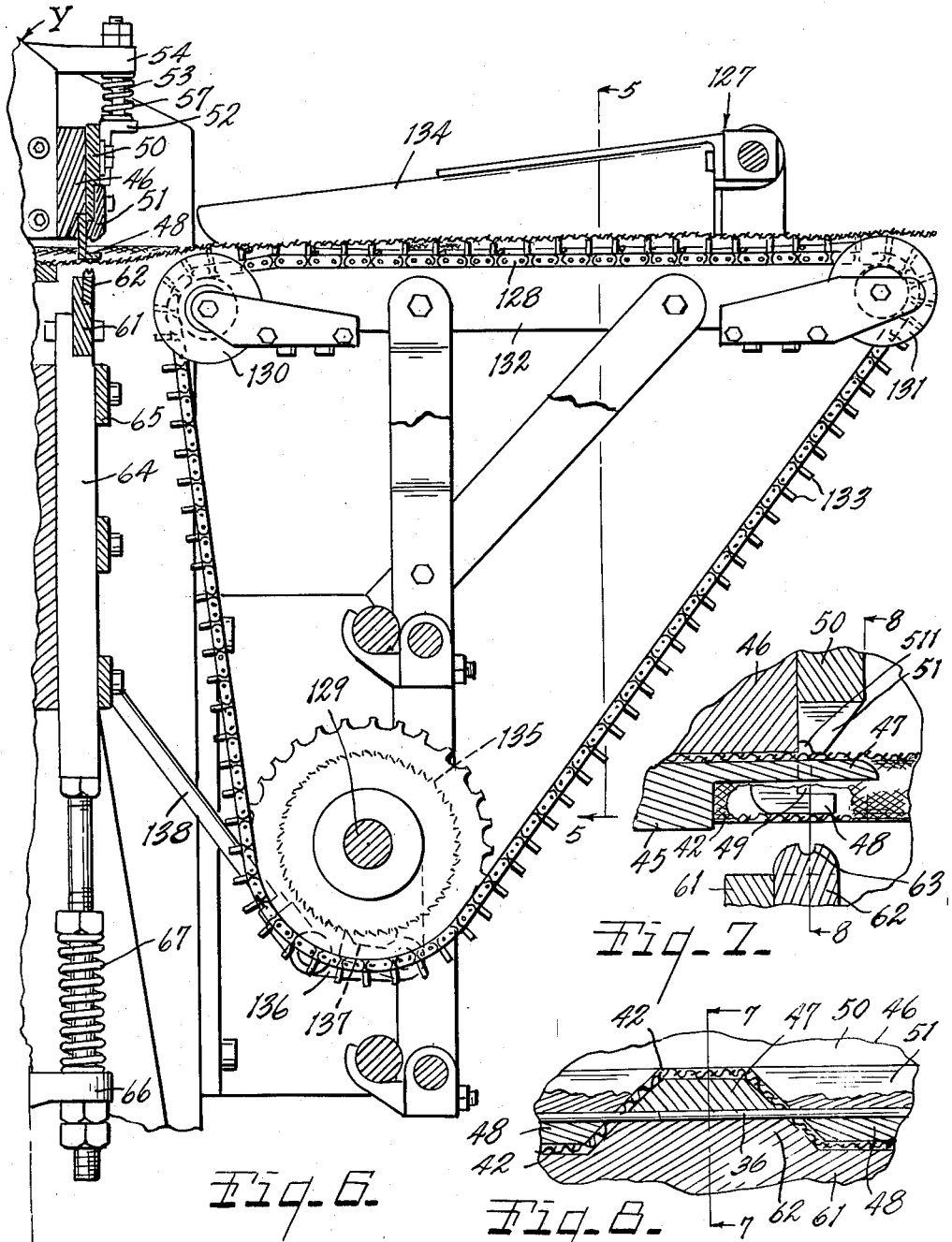

INVENTORS
William F. Richardson
Eugene J. Hood
By [signature]
Attorney

INVENTORS
William F. Richardson
Eugene J. Hood
BY Otis Q. Earl
Attorney

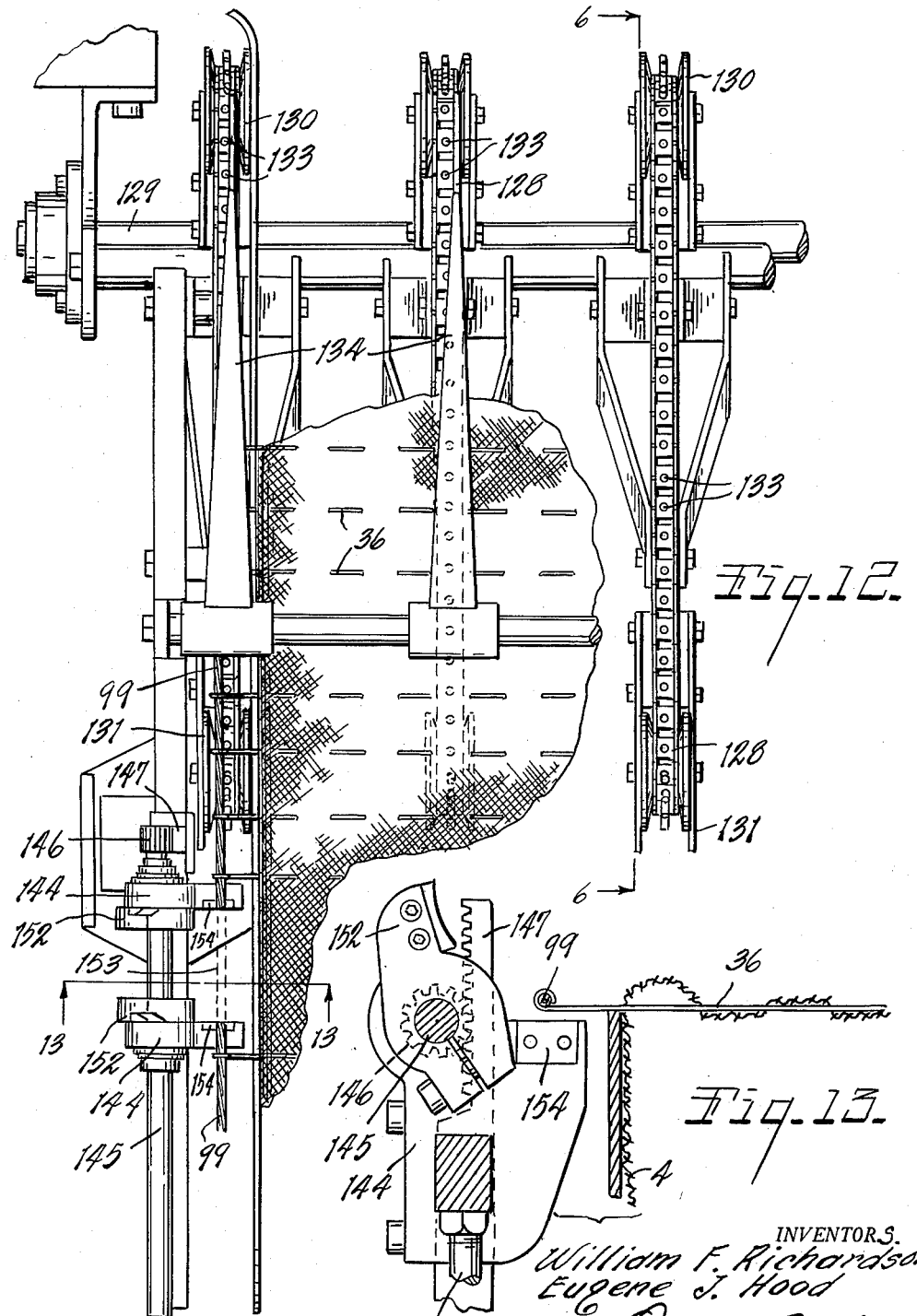

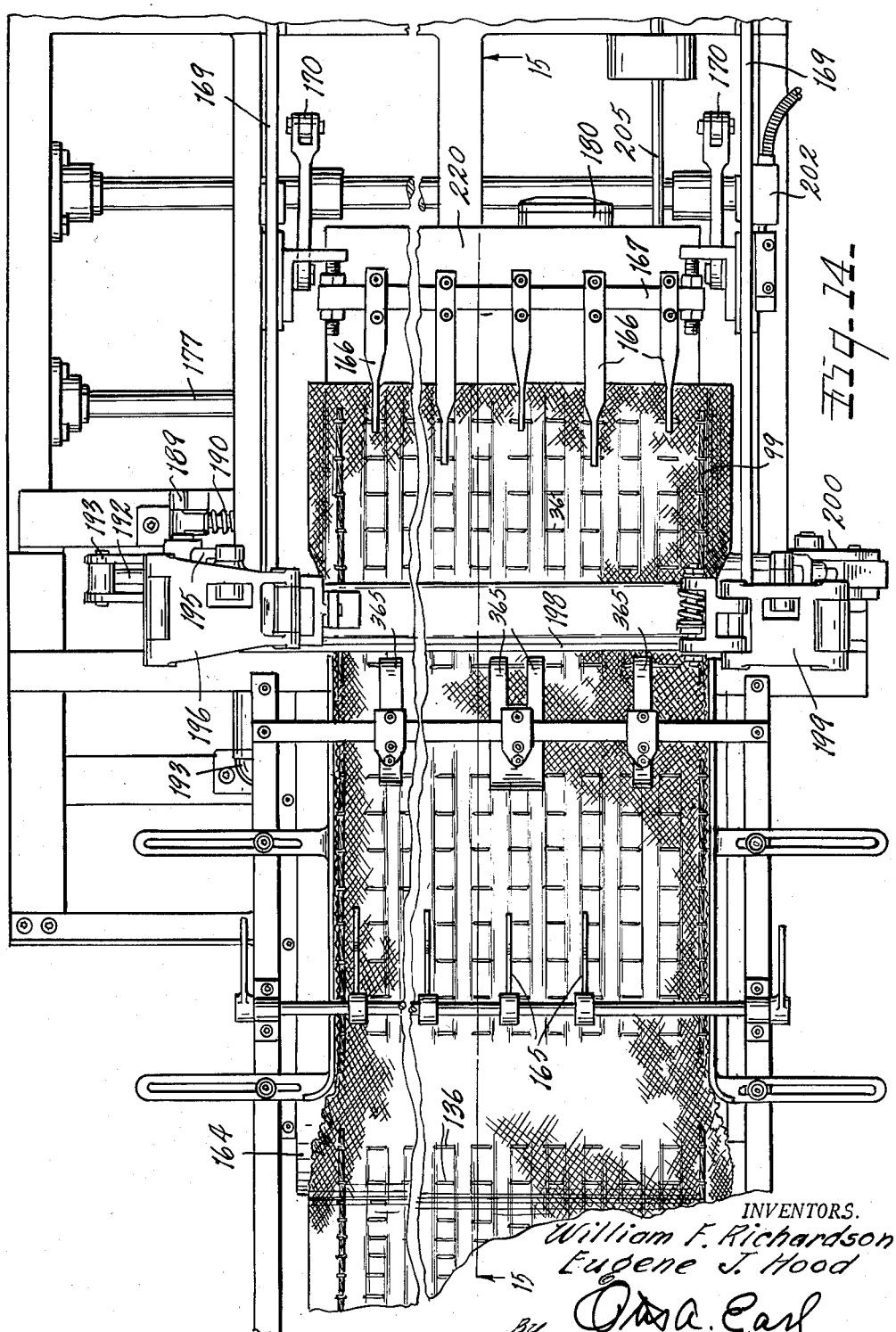

INVENTORS.
William F. Richardson
Eugene J. Hood
By O. A. Earl
Attorney.

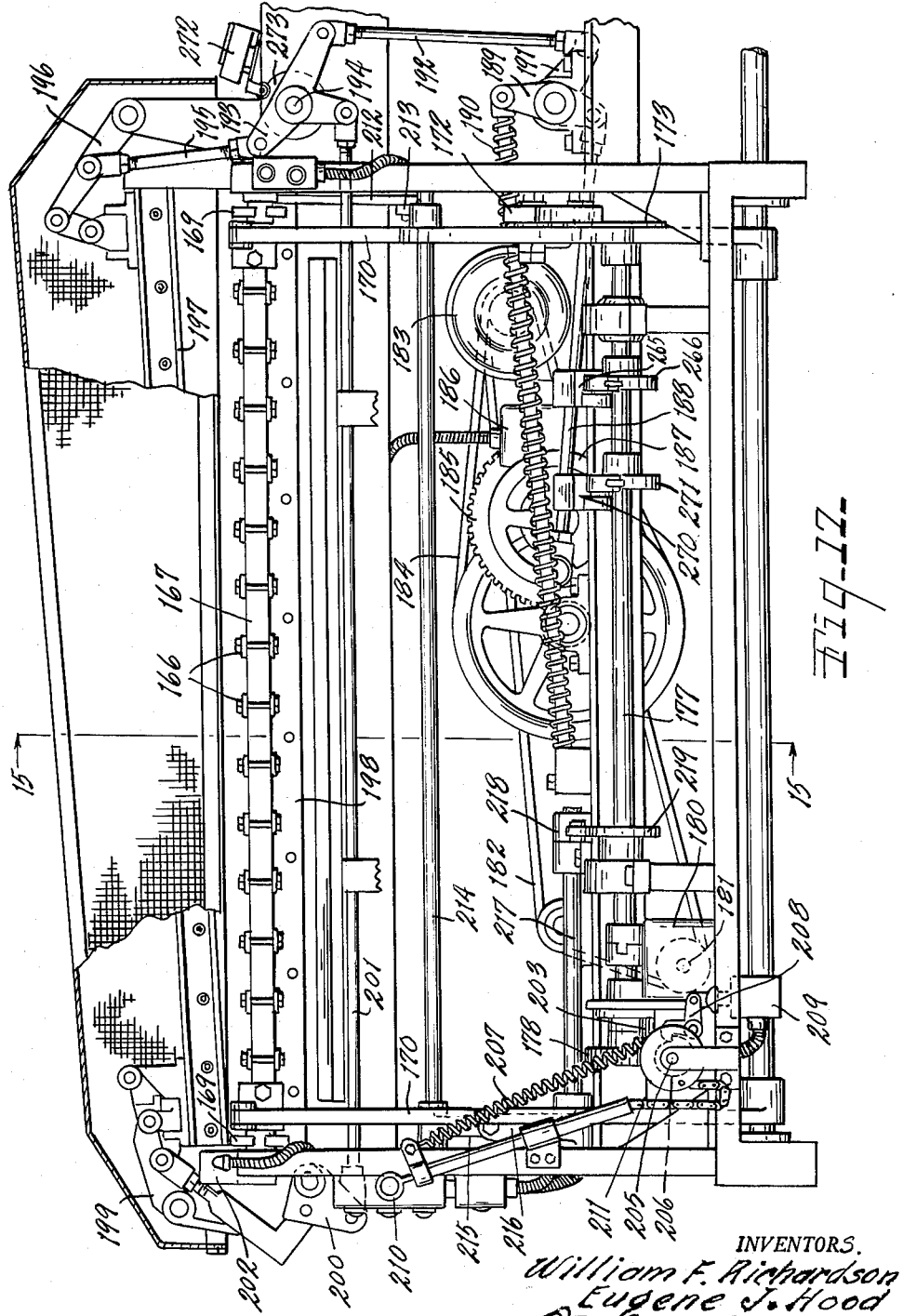

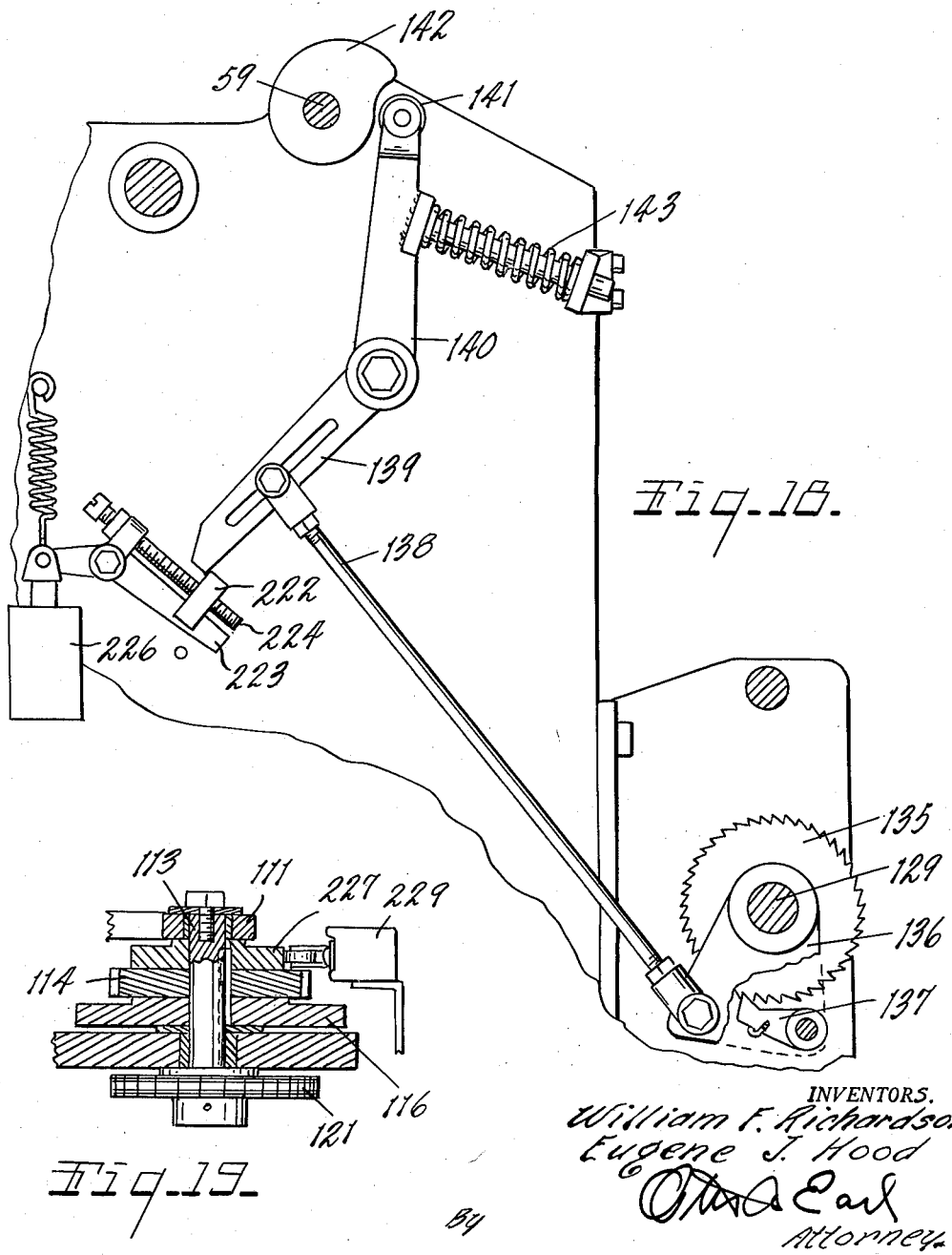

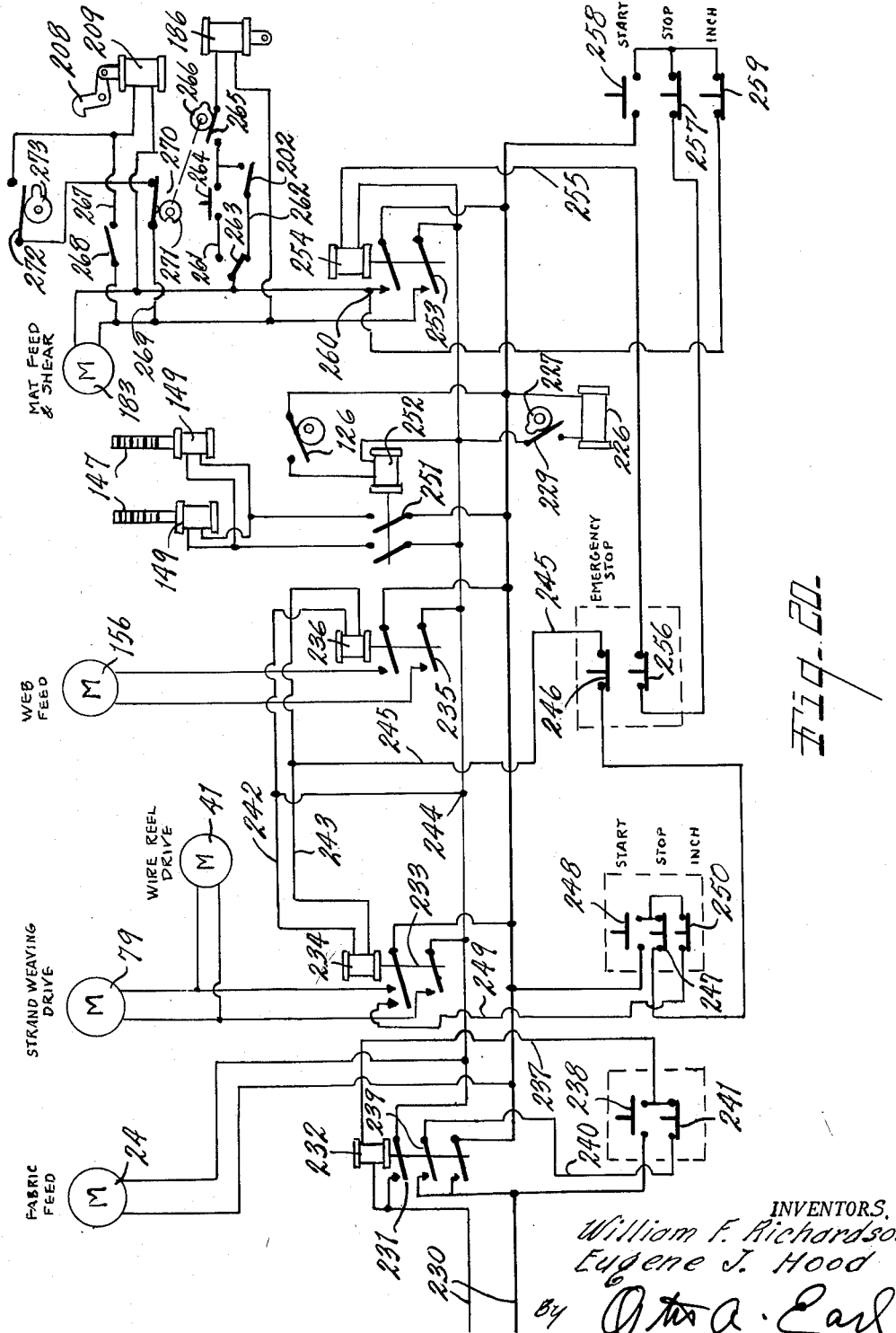

United States Patent Office 2,982,317
Patented May 2, 1961

2,982,317
MACHINE FOR MANUFACTURING REINFORCED FABRICS

William F. Richardson and Eugene J. Hood, Carthage, Mo., assignors to Flex-O-Lators, Inc., Carthage, Mo., a corporation of Missouri Filed July 7, 1953, Ser. No. 366,477
27 Claims. (Cl. 140—3)

This invention relates to improvements in machine for manufacturing reinforced fabrics.

The main objects of the invention are:

First, to provide a machine for manufacturing reinforced fabric suitable for use in upholstery, particularly to be disposed upon or superimposed on a supporting spring unit or assembly to receive and support the padding and the upholstery arranged over the padding.

Second, to provide a machine of this character which is automatic in its operation, of large capacity, and requires a minimum of labor other than general supervision and supplying the materials which enter into the product.

Third, to provide a machine of this character which is adapted to produce individual mats or units and is capable of producing units of different dimensions.

Fourth, to provide a machine for the purpose indicated, the use of which results in a very uniform product.

Fifth, to provide a machine for producing individual reinforced mats or units comprising a base fabric sheet and one in which the edges of the sheet project or extend beyond the reinforcing elements.

Sixth, to provide a machine having the advantages stated in which there is substantially no waste of material.

Further objects and objects relating to details and economies of the invention will appear from the description to follow. The invention is defined in the claims.

A structure which embodies the features of the invention is clearly illustrated in the accompanying drawings, in which:

Fig. 1 is a side elevational view of a machine embodying the invention shown in two sections, the division being on line A—A.

Fig. 2 is an enlarged fragmentary longitudinal section of the fabric feed and as viewed from the rear or side opposite that shown in Fig. 1 and its feed control mechanism.

Fig. 3 is a fragmentary view taken along the plane of line 3—3 of Fig. 2 and illustrating the fabric feed drive.

Fig. 5 is a fragmentary view partially in transverse section illustrating certain details of the mechanism for weaving the reinforcing strands into the fabric and certain of the adjustment features and taken along the plane of line 5—5 in Figs. 4 and 6.

Fig. 6 is an enlarged fragmentary view in section on a line corresponding to line 6—6 of Fig. 5 showing further details of this mechanism.

Fig. 7 is an enlarged fragmentary cross sectional view through the jaws that fold the fabric for weaving the reinforcing wire therethrough and taken along the plane of the line 7—7 in Fig. 5.

Fig. 8 is an enlarged fragmentary transverse cross sectional view through the weaving jaws and taken along the plane of the line 8—8 in Fig. 7.

Fig. 12 is an enlarged fragmentary plan view of the border strand severing mechanism appearing in elevation in Fig. 1.

Fig. 13 is an enlarged fragmentary view partially in section on line 13—13 of Fig. 12.

Fig. 14 is a fragmentary plan view of the front or delivery portion of the machine illustrating the means for feeding the reinforced fabric and severing it into units and delivering the units to a receiving table.

Fig. 15 is a fragmentary view in vertical section on a line corresponding to line 15—15 of Figs. 14 and 17.

Fig. 18 is a fragmentary vertical longitudinal cross sectional view taken along the plane of the line 18—18 in Fig. 5 and illustrating mechanism for controlling the feed of the fabric through the weaving mechanism to control the space between successive reinforcing strands.

Fig. 19 is a fragmentary cross sectional view taken along the plane of the line 19—19 in Fig. 9 and illustrating the timing cam and switch that control the spacing mechanism shown in Fig. 18.

Fig. 20 is a schematic wiring diagram of the electrical control circuit of the machine.

Figure 4:
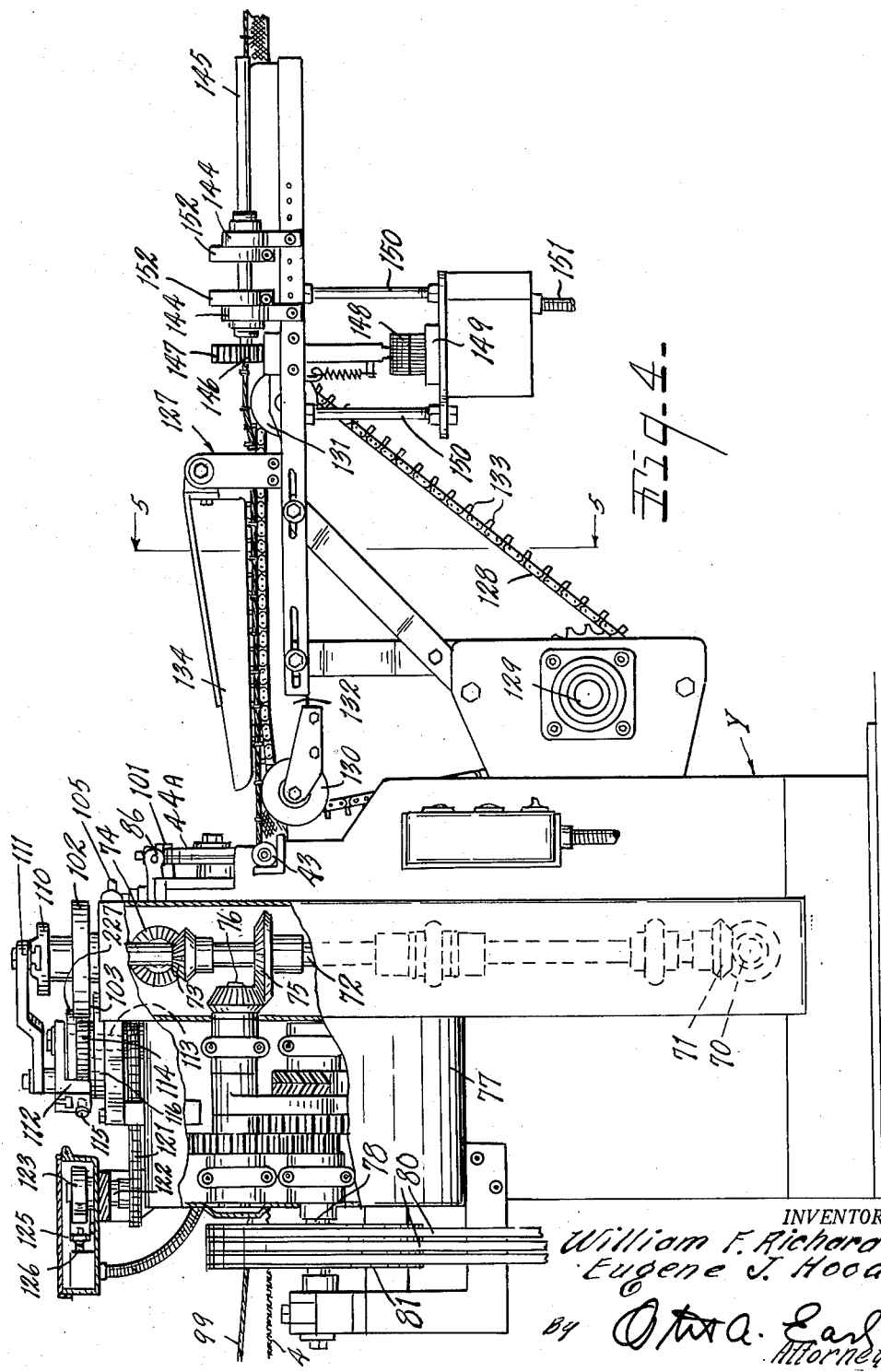
Fig. 4 is an enlarged side elevational view showing certain features of the mechanism for weaving the reinforcing strands into the fabric and the feed means directly associated therewith.

The invention relates to a machine for manufacturing reinforced fabrics particularly designed as upholstery supporting mats, that is, mats which are superimposed on spring assemblies to support the upholstery thereon. Mats of this type consisting of a sheet of fabric such as burlap or the like with wire strands woven therethrough and secured at their ends to longitudinal strands as illustrated in the drawing have been and now are extensively used. The patent to Leal No. 2,218,758, October 22, 1940, is for a machine and method of manufacturing reinforced fabric of this type and the structure of this application includes certain features of that patent, particularly in the matter of inserting the strands through the fabric and the connection of the ends thereof with longitudinal strands. The machine of this invention, however, embodies various features that are not disclosed in and are foreign to the disclosure of that patent.

This invention is designed to greatly increase production, to enable the making of mats of various dimensions by a simple adjustment of the machine, and to produce the mats with border or edge portions extending beyond the reinforced strands and to deliver the mats in completed units. To that end the machine comprises a fabric feed mechanism designated in Fig. 1 generally by the letter X, a mat forming unit designated generally by the letter Y, and a cutter and delivery unit designated generally by the letter Z. While these for convenience are designated as units, they are all a part of the complete machine and all cooperate in producing the finished product.

The fabric feed unit X comprises a base frame 1 which is supported in an inclined position by means of the legs 2 disposed at the rear end thereof. The elements of the machine will be considered as oriented relative to the progress of the work therethrough starting at the rear. The frame for the operating mechanisms is designated generally by the numeral 3 as the details thereof form no part of this invention, that is, they are not described in detail. It should be understood that the frame may varied to provide suitable support for the operating mechanism.

The fabric web 4 is supplied in the form of a roll 5 which is rotatably supported on the rollers 6. The roll of fabric is supported endwise by the end members 7 which are slidably mounted on the rods 8 disposed between the rolls and adjusted by means of the screw 9 having a crank 10 at one end which is retained in its adjusted positions by a pin 11 selectively engaged with the hole 12 in the disc 13. This enables the centering of rolls of different width material.

The fabric is fed from the feed roll 14 mounted on the driven shaft 15, this feed roll having a friction surface or facing 16. The pressure roller 17 mounted on the arms 18 on the shaft 19 yieldingly holds the web of fabric against the feed roller. This pressure roller 17 has a yielding friction facing 20 of relatively soft rubber.

From the feed roller the web of fabric is passed downwardly around the bar 21 and then upwardly over the guide roller 22. The bar 21 is carried by the arms 322 pivoted on the frame at 23. The feed roller is driven from the motor 24, the shaft 25 of which is connected by the coupling 26 to a drive shaft of the variable speed hydraulic drive unit designated generally by the numeral 27. The drive unit is connected by the train of gears 28 to the roll shaft 15.

The hydraulic drive unit includes a control element 30 projecting from the unit housing and provided with an arm 31 which is connected by the links 32 and 33 to one of the supporting arms 322 for the rod 21 around which the fabric is passed. As will appear from the description to follow, the fabric is fed at variable speeds to meet the requirements or conditions of other portions of the parts of the machine. The link 32 passes through an adjustable friction bearing 34 that holds the link in its several adjusted positions as will appear. The link 33 has a sleeve 35 on its upper end that slides on the link 32 between spaced stops 355 and 356. This drive unit illustrated is a hydraulic transmission which is available as a unit and therefore is not detailed.

One advantage of this feed mechanism is that the fabric commonly used, such as burlap, is loosely woven and by providing a positive variable feed it is not subjected to stretching distortion as it is advanced or drawn into the mat forming unit Y by which the reinforcing strands 36 are inserted or woven through the fabric as is shown in Figs. 4 to 11. If the forming unit runs faster than the feed roll 15 for any appreciable time, the loop of fabric and rod 21 is raised to actuate the arm 322 and stop 355 and speed up the feed roll drive. Overfeeding of the roll 14 relative to the forming unit Y causes the loop to enlarge and lower the arm 322 and sleeve 35 against the stop 356 to slow down the roll 14. Minor speed variations of short interval are accommodated by travel of the sleeve 35 between the stops.

The re-enforcing strands 36 are formed of sections of resilient wire which is supplied in the form of a coil 37 placed in a holder 38, the holder being rotatively supported on a vertical axis or shaft and driven through the sprocket chain 39 and suitable sprockets through a transmission designated generally by the numeral 40 from the motor 41.

To permit the weaving of the strands through the fabric, the fabric is formed into a plurality of flute-like offsets 42 (see Fig. 5), the strand forming stock 37 being passed through suitable guides 43 to the feed rollers 44 and 44A. The offsets 42 are formed by the coacting former members 45 and 46 on which are alternately disposed coacting projections 47 and 48, respectively. (See Figs. 7 and 8.)

The former member 45 and its projections 47 are vertically fixed and constitute a table or support over which the fabric is advanced. The former member 46 extends transversely across the machine and is also vertically fixed, the web of the fabric being initially threaded between the former members and their projections and thereafter drawn therebetween by web advancing mechanism to be described. As is most readily apparent from a consideration of Figs. 6 to 10, the projections 48 carried by the former member 46 project downwardly between the projections 47 to form the offsets or flutes 42 in the fabric. There is a vertical space 49 between the bottoms of the projections 47 and the tops of the projections 48. It is through this space that the reinforcing strands are advanced transversely through the vertical stretches of the offsets in the fabric.

In order to guide the reinforcing strand as it is projected across the width of the fabric and between the projections 47 and 48, there is provided an upper guide plate 50 lapped along the front side of the former member 46. The guide plate 50 has spaced depending guide teeth 51 on its lower edge which teeth are adapted to move downwardly between the projections 47 to directly over the projections 48. The teeth 51 have transversely extended rounded recesses 511 formed therein to receive and guide the leading end of the reinforcing strand as the strand is projected between the projections 47 and 48. The guide plate 50 is connected to end brackets 52 having upstanding actuating pins 53. The pins 53 project upwardly through rocker arms 54 pivotally supported on the pivot 55. The rocker arms 54 have crank arms 56 and cam followers 57 that coact with cams 58 on the shaft 59. Depression of the rocker arms 54 functions through springs 60 to depress the guide plate 50.

Coacting with the guide plate 50 and its teeth 51 is a transversely extending lower guide plate 61 having upwardly projecting guide teeth 62 spaced thereacross. The guide teeth 62 on the lower guide plate are adapted to project upwardly between the projections 48 on the upper former member into close proximity with the undersides of the fixed projections 47. The upper edges of the teeth 62 are transversely notched as at 63 to form recesses coacting with the recesses 511 in the upper guide teeth to form a substantially continuous guide channel for the reinforcing strand. The lower guide plate 61 is supported on vertical bars 64 slidably mounted in guides 65. The lower ends of the bars 64 coact with rocker arms 66 and springs 67 (see Figs. 5 and 6) to vertically and yieldably advance the lower guide plate. The rocker arms 66 are pivotally supported at 66A and have crank arms and cam followers 68 coacting with cams 69 on a lower cross shaft 70. The lower cross shaft 70 is driven in timed relationship with the upper cross shaft 59 by engagement with beveled gear 71 on the lower end of the upright drive shaft 72 (see Figs. 4 and 5).

The shaft 72 which operates the lower cross shaft 70 is provided on its upper end with a bevelled gear 73 (see Fig. 4) driving a mating bevelled gear 74 on the upper cross shaft 59. The shaft 72 is provided with a third bevelled gear 75 that is driven from a shaft 76 mounted in a gear box or transmission 77. The drive shaft 78 of the transmission is driven from the motor 79 by means of belts 80 driving the pulley 81. The upper and lower guide members 50 and 61 are thus vertically reciprocated at a constant rate of speed by the motor 79.

The feed roller 44 which advances the wire strands 37 through and across the width of the fabric is constantly driven from the transmission shaft 82 (see Fig. 9) but does not function to feed the wire strand until the upper coacting pressure roller 44A is pressed downwardly into coacting relation with the lower feed roll. The structure for controlling and actuating the pressure roller 44A will be described in detail presently.

Figure 11:
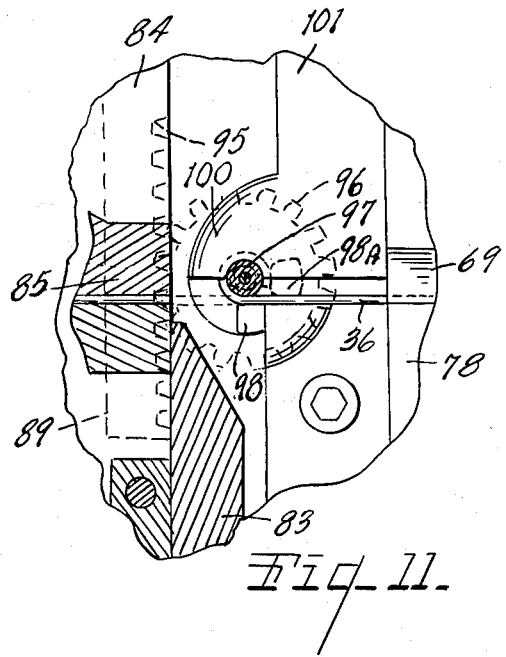
Fig. 11 is an enlarged fragmentary cross sectional view through the reinforcing wire and border strand tying mechanism and taken along the plane of line 11—11 in Fig. 9.

After the reinforcing strand has been woven through the fabric, the strand is severed from the incoming stock by means of a shear block 83 (see Fig. 11). The shear block 83 is carried by a vertically extending rod 84 that is positioned at the left end of the former members 45 and 46. The rod 84 which supports the shear block 83 slides behind fixed guide and cutoff member 85 through which the incoming stock is fed. The rod is connected at its upper end to a lever 86 pivotally supported at 55 and having a cam follower 87 engageable with a cam 88 on the shaft 59.

Rack bars 89 positioned at each end of the former members and behind the rod 84 are connected at their upper ends to links 90. The links 90 connect to levers 91 pivoted at 92 and having cam followers 93. The followers 93 coact with cam 94 on shaft 59 to reciprocate the rack bars. Coacting with the teeth 95 of the rack bars are gears 96 which have hollow hubs through which the border strands 97 are drawn with the advancing motion of the fabric. The gears 96 carry bending lugs 98 which are rotated around the strands 97 as the rack bars are raised to wind the ends of the reinforcing strands 36 around the border strands 97. Fig. 11 shows the bending lugs 98 in full line position before the bending operation starts and in dotted lines at 98A with the completion of the bending operation. The shear block 83 severs the strand and starts the bend in the end of the strand. The lug 98 completes the wrap in the end of the strand 36 while the block 83 prevents additional stock from entering through the fixed guide 85. In order to support the relatively flexible border strands during the bending operation backing shoes 100 are reciprocated downwardly over the border strands. The shoes 100 extend upwardly for actuation by cam levers 101 from cams on the shaft 59. The structure is the same as that shown in the Leal Patent 2,218,758.

The operation of the upper and lower guide plates 50 and 61, strand feeding pressure roll 44A and the rack bars 89 is all controlled in a timed relationship from the shaft 76 and the shaft 72 driven from it. Mounted on top of the upright shaft 72 is a disk 102 having a cam 103 on its undersurface. Each rotation of the cam 103 engages and depresses the follower roll 104 on a lever 105 pivotally supported at 106. The opposite end of the lever 105 is connected to the bolt 107 and the bolt 107 is in turn connected to a carriage 108 on which the pressure roll 44A is mounted. The carriage and pressure roll are constantly urged downwardly into operaive stock feeding position by spring 109 (see Feg. 5) and the cam 103 functions to move the pressure roll to non-feeding position.

Positioned above the disk 102 on the shaft 72 and rotatable with the shaft is a crank wheel 110 having a T-slot in its upper surface. The T-slot adjustably receives a crank arm 111 that extends to and is adjustably connected with a ratchet lever 112. The ratchet lever 112 is pivotally supported on a stub shaft 113 (see Figs. 4, 5 and 9) and the connection between the crank arm 111 and the ratchet lever 112 is adjustable radially of the ratchet lever so that the throw of the ratchet lever can be adjusted. Rotatably mounted on the stub shaft 113 is a ratchet wheel 114 which coacts with the pin 115 carried by the ratchet lever so that the ratchet wheel is advanced by a variably adjustable increment upon each rotation of the shaft 72 and upon each actuation of the strand feed mechanism and the guide plates. Rotatable with the ratchet wheel 114 is a cam disk 116 having peripheral cam surface that engages the roller 117 on a reinforcing stock feed interrupting lever 118. The lever 118 is pivotally supported at 119 (see Fig. 9) and has a blocking arm 120 adapted to swing underneath the lever 105 to prevent downward movement of the carriage 108 and the pressure feed roll 44A. When the pressure feed roll is not depressed, no reinforcing strand will be driven and threaded through the fabric and it will be apparent that by proper selection of a cam disk 116 and adjustment of the connecting arm 111, the machine may be made to skip the reinforcing rod feeding operation at predetermined points in the cycle of the machine.

The stub shaft 113 further carries a sprocket that drives the chain 121. The chain 121 operates a timing shaft 122 on which the timing cam 123 is mounted. The cam 123 has one or more lifts 124 that engage and actuate a breaker crank 125 to open a control switch 126. The function of the switch 126 in regulating other portions of the machine will be described presently.

The fabric and the border strands with the reinforcing strands connected thereto is drawn through the machine by a conveyor generally indicated at 127. The conveyor 127 comprises a plurality of chains 128 trained around suitable sprockets on drive shaft 129 and idler shafts 130 and 131. The shafts 130 and 131 are connected by rails 132 which support the upper horizontal reaches of the chains. The chains and their supporting sprockets are adjustable along the width of the machine to accommodate fabric webs of various widths. Spaced links of the chains 128 have projecting pins 133 thereon which engage behind and pull ahead the reinforcing strands 36 that are engaged in the fabric. Depressor blades 134 mounted above the conveyor hold the fabric down in engagement with the pins 133.

The drive shaft 129 and the conveyor 127 are advanced in step by step fashion by means of a ratchet wheel 135 secured to the shaft on the backside of the machine (see Figs. 5 and 6). A ratchet lever 136 swingably mounted on the shaft 129 has a pawl or dog 137 that coacts with the ratchet wheel 135. The lever 136 is drivingly oscillated by a connecting rod 138 which extends upwardly and rearwardly to a crank 139 pivotally supported from the frame of the machine at 140 (see Figs. 5 and 18). One arm of the crank 139 carries a follower 141 that coacts with cam 142 on the end of shaft 59. A spring 143 biases the cam follower and connecting rod toward the cam.

It will be noted that the conveyor 127 and the fabric carried thereby is advanced an increment with each rotation of the shaft 59. The length of advance may be adjusted by adjusting the connection between the connecting rod 138 and the crank 139. This adjustment is permanent during operation of the machine. Mechanism for automatically varying the fabric feed during operation will be described presently. The fabric thus advances continuously in a step by step fashion while the machine is in operation. The guide plates 50 and 61 operate continuously but a reinforcing strand is not necessarily advanced and threaded through the fabric with each advancing step thereof depending upon the position of cam disk 116 and the blocking arm 120 which control the pressure feed disk 44A. When it is desired to produce mats or units of a given length and with a prescribed amount of unreinforced fabric at each end of the mat, the cam disk 116 is selected and adjusted to leave a given length of the fabric unreinforced after the required number of reinforcing strands have been installed.

In order to separate or cut the continuous strip of fabric into mats or units of the desired lengths, it is highly desirable to cut out and remove a length of the border strands 97 at what will be the ends of the mat. This leaves unreinforced unobstructed aprons of the desired length on the mat. The structure for accomplishing this removal of sections of the border strands is best illustrated in Figs. 4, 12 and 13. The structure includes a pair of longitudinal spaced and adjustable bearing brackets 144 mounted on each side of the fabric as it advances from the conveyor 127. The bearing brackets rotatably support longitudinally extending shafts 145. One end of each shaft carries a gear 146 and the gear is in mesh with a rack bar 147. The lower end of the rack bar is connected to the armature 148 of a solenoid 149. The solenoids are suspended below the frame work of the machine by rods 150 and are connected through an electrical cable 151 to the previously mentioned switch 126. The electrical connections to the solenoid will be described in greater detail presently. Depression of the rack bars 147 rotates the shafts 150 and also rotates cutter blades 152 secured to the shafts adjacent each of the bearing brackets 144. By adjustment of the bearing brackets and the cutter blades 152 along the shafts 145 and by timing the operation of the lift 124 on cam 123 to actuate the switch 126, any selected portion of the border strands may be cut out as is indicated by the dotted lines at 153 in Fig. 12. Fixed backing members or shear plates 154 are mounted on the bearing brackets 144 to coact with the rotating cutter blades 152.

After the selected portions of the border strands have been cut away, the fabric with its reinforcing strands is advanced over a feed roll 155 (see Fig. 1) which is independently driven by a motor 156 through the chain 157. The fabric is fed into a depending or self-suspending loop or reach 158 that extends underneath a curved guide element 159 carried by the control arm 160. The control arm 160 is pivotally supported at 161 and connected to a lever 162 for operating the speed control cable 163.

The fabric rises from the loop 158 and the guide member 159 to a table or way 164. Brake shoes 165 prevent the fabric from sliding rearwardly toward the loop 158 but permit ready advance of the fabric. Spring biased friction shoes 365 place a drag on the fabric and hold it taut as it is advanced across the end of the table.

The fabric is advanced across the end of the table 164 by oscillating gripper arms 166 carried by a cross head 167. The gripper arms 166 have two or more jaws 168 spaced to hook over and engage two adjacent reinforcing strands carried by the fabric. The cross head 167 is slidable in longitudinal guide rails 169 from the advanced feeding position shown in Fig. 15 to the retracted work gripping position shown by the dotted lines at 167A in the same view. The cross head is reciprocated by a lever 170 and the guide rails 169 are swingable upwardly about the pivot 171 to raise the jaws 168 over the fabric and the reinforcing strands on the retracting stroke of the grippers as will be described. The lever 170 is actuated by the adjustable connecting rod 172 from a lever 173.

Figures 16, 17:
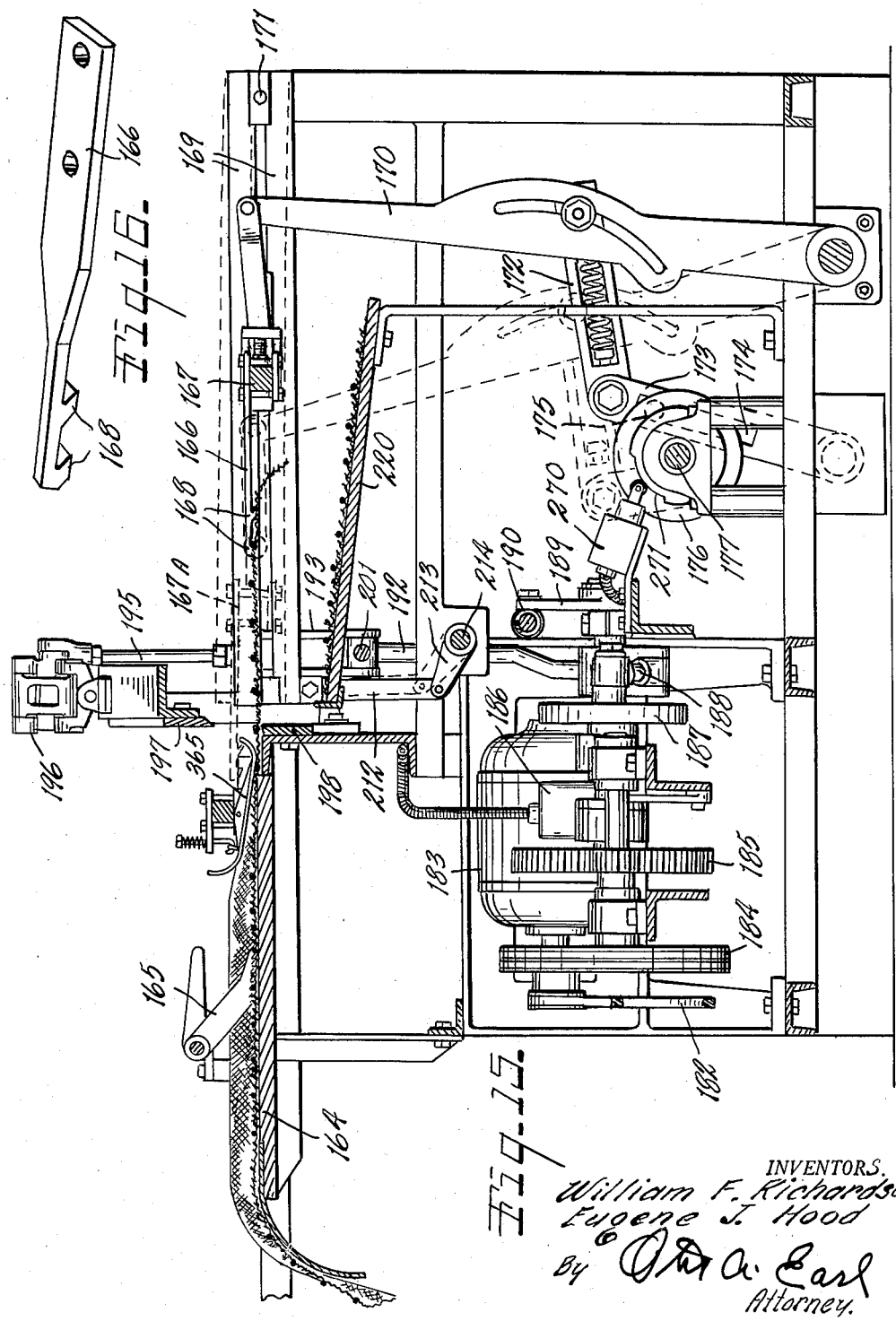
Fig. 16 is a perspective view of one of the feed grippers.
Fig. 17 is a fragmentary rear end elevation view of the machine.

The lever 173 is slotted as at 174 (see Fig. 15) to receive the crank pin 175 carried by the disk 176. The disk 176 is driven by a control shaft 177 that extends transversely across the machine. The shaft 177 is driven through a gear train 178 from the output shaft 179 of an adjustable speed hydraulic transmission 180. The transmission 180 is supplied with power through the shaft 181 and belt 182 from the motor 183. The motor 183 is connected through a separate belt drive 184 and gear train 185 to a solenoid operated clutch 186. The clutch 186 functions to connect the motor 183 to a crank wheel 187 and a connecting rod 188 connects the crank wheel to a bell crank 189 (see Fig. 17). One arm of the bell crank 189 is spring loaded or biased by the spring 190 while a third arm 191 connects to a link 192. The link 192 extends upwardly to a second bell crank 193 having a fixed pivot 194. One arm of the crank 193 is connected by the link 195 to the suspension linkage 196 at one end of a cutoff or shear blade 197 that extends transversely across the machine. The blade 197 coacts with a fixed shear blade 198 to sever mats of predetermined length from the strip of the fabric. The left end of the shear blade 197 as appearing in Fig. 17 is supported by a system of links and levers 199 and this system is interconnected through the crank 200 and cross rod 201 with the previously mentioned bell crank 193. The obvious function of the knife supporting linkages 196 and 199 and the driving connections thereto from the crank wheel 187 is to reciprocate the blade in response to actuation of solenoid clutch 186 as will more fully appear when the electrical circuit is described. Note that the linkage 196 and the associated end of the blade 197 is higher than the linkage 199 and the other end of the blade so that the blade moves downwardly in a progressive shearing action along the edge of the fixed blade 198.

The ratio of hydraulic transmission 180 and, therefore, the speed of the gear train 178 and control shaft 177 can be varied by the previously mentioned control cable 163 that is connected to the control arm 160. As the earlier operating portions of the machine tend to increase the output of reinforcing fabric, the control arm 159 will drop and actuate the control cable 163 and hydraulic transmission 180 to speed up the operation of the control shaft 177 and the feed lever 170. Conversely increased off feeding of the fabric by the jaws 166 relatively to the speed of delivery of the fabric will shorten the loop 158 and slow down the operation of the control shaft 177 and lever 170.

In order to insure that the blade 197 will not descend while the work gripping and advancing jaws 166 are retracted underneath the blade, the cross head 167 is arranged to coact with a limit switch 202 adjustably mounted on the frame of the machine near the end of the advance stroke of the cross head. The switch 202 is electrically interlocked with the solenoid 186 which actuates the driving mechanism for the blade.

Operation of the control shaft 177 and, therefore, the cross head 167 may be interrupted by disengaging the end gear 203 of the transmission gear train 178. This is accomplished by means of a shift fork 204 mounted on a shaft 205. The shaft 205 carries a locking disk 206 (see Fig. 17) that is spring biased toward gear disengaging position by the spring 207. The locking pawl 208 holds the disk and shaft against the tension of spring 207 but may be withdrawn from engagement with this disk by energization of a solenoid 209. Release of the pawl 208 will interrupt the control shaft 177 and operation of the lever 170 that feeds the fabric to the cut off blade. Operation of the shaft 177 can be restored by pulling upwardly on the control rod 210 which is connected at its lower end to a chain 211 positioned to wrap around the shaft 205 when the shaft is moved to disengage the gear 203.

The control shaft 177 also operates or actuates the guide rails 169 that raise the cross head and grippers 166 as the grippers retract over the work. This is accomplished by lifting links 212 (see Fig. 15) connected between the rails and cranks 213 on a rock shaft 214. The rock shaft 214 carries an arm 215 near its forward end (see Figs. 1 and 17) which arm is engaged and actuated by a tappet 216 on the rock shaft 217. The rock shaft 217 carries a crank arm and cam follower 218 that coacts with and is actuated by the cam 219 on the previously mentioned control shaft 177.

Finished mats when advanced by the grippers 166 and severed from the following portion of the fabric fall upon a platform or table 220 from where they can be removed manually after the desired number of mats have been accumulated in the pile.

The spacing between successive reinforcing strands 36 on the fabric may be automatically varied by structure shown best in Figs. 18 and 19. The previously mentioned arm 139 that actuates the ratchet pawl 137 is biased to retract the pawl by a spring 143. The cam 142 on shaft 59 functions to advance the arm 139 and pawl to a fixed forward position but the retracting motion of the pawl and arm may be varied by interposing a stop 222 in the path of the swinging end of the lever 139. The stop 222 is carried on a lever 223 and is adjustable therealong by the screw 224. The lever and stop are swingable about a pivot 225 under the control of a solenoid 226. Thus when the lever 223 is lowered, the arm 139 clears the stop and retracts to extreme position for the longest adjusted advance of the pawl 137 and the conveyor 128. However, when the solenoid 226 is actuated, the arm and pawl will retract an adjusted shorter distance for a shorter feed of the fabric web.

Figure 9:
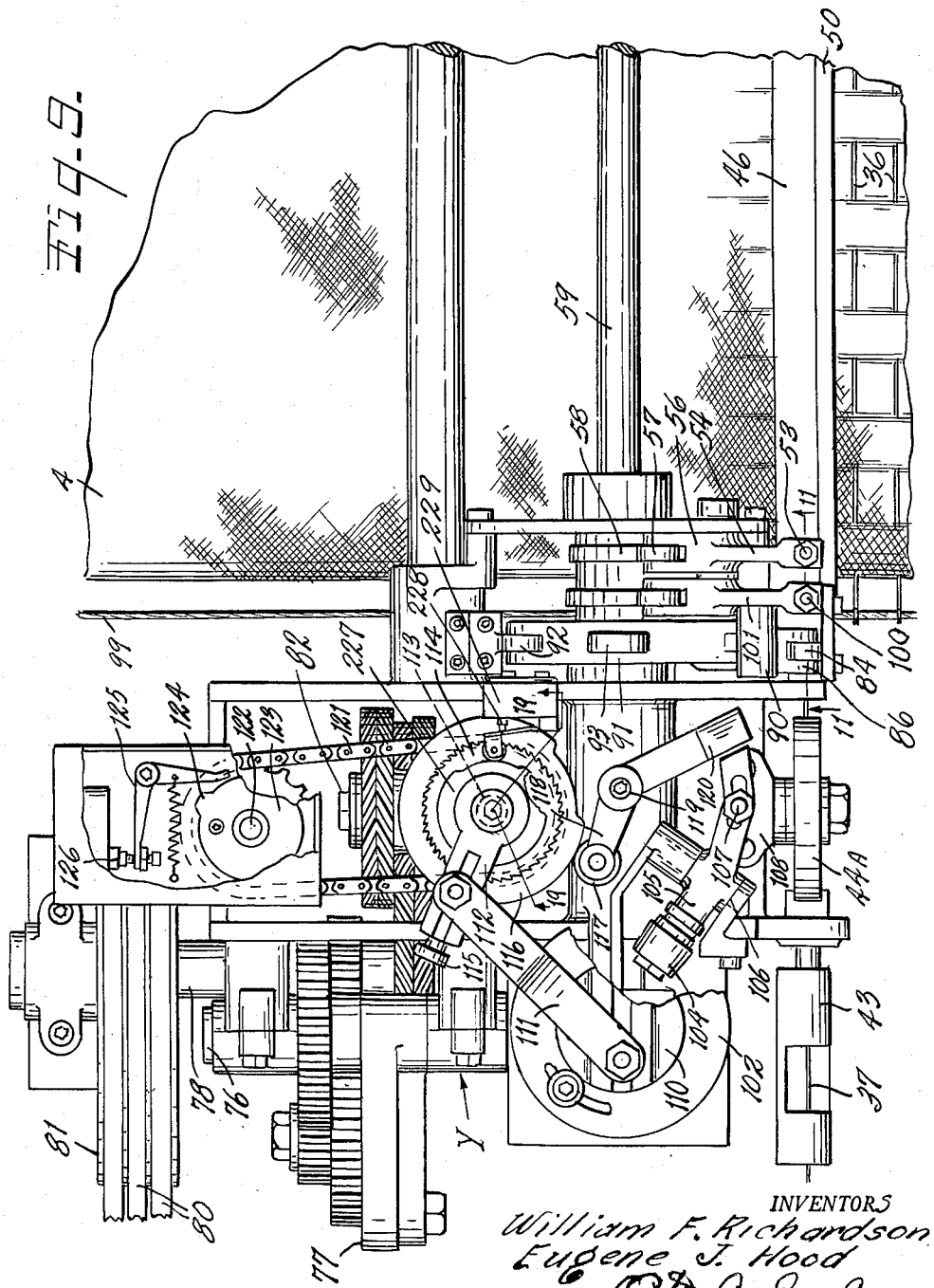
Fig. 9 is a fragmentary plan view showing details of the timing and control mechanism for the weaving structure shown in Figs. 5 to 8.
Figure 10:
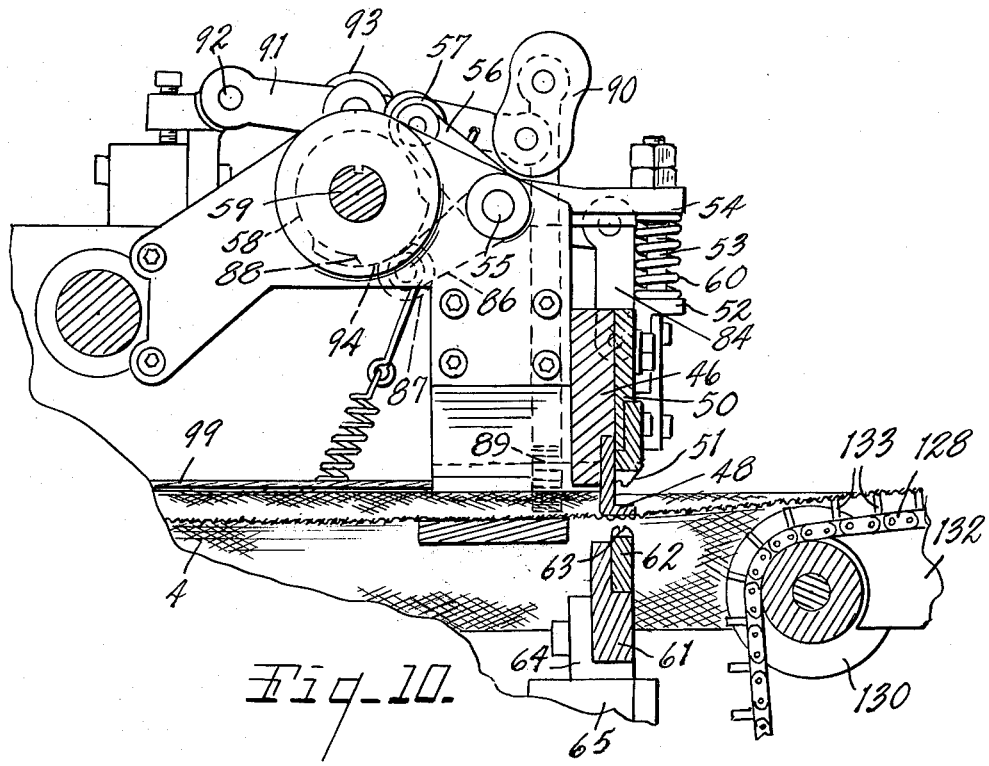
Fig. 10 is an enlarged fragmentary cross sectional view similar to Figs. 6 and 7 and taken along the plane of line 10—10 in Fig. 5.

The solenoid is controlled by structure best shown in Figs. 9 and 19. The stub shaft 113 that carries the ratchet wheel 114 also carries a cam disc 227 that rotates with the wheel 113. The disc 227 engages and actuates the plunger 228 of a switch 229 and the switch 229 is connected to control the solenoid 226. The cam disc 227 can thus be shaped and oriented to reduce the normal strand spacing between the strands 36 at any predetermined location in the mats and in any location with respect to the position of unreinforced web as determined by the cam 123 and switch 126.

The electrical connections or circuit for controlling operation of the machine are shown in Fig. 20. The power source is indicated at 230 and the initial fabric feed motor 24 is connectable across the power source by a relay switch 231 having an actuating solenoid 232. The switch 231 also acts as a master switch to condition the remaining elements of the circuit for operation. The motor 79 which operates the reinforcing strand feeding and weaving structure and the motor 41 for the wire reel drive are connectable across the power source by a relay operated switch 233 having an actuating solenoid 234. The intermediate fabric advancing motor 156 which advances the reinforced fabric web from the weaving portion of the machine is connectable across the power source by a relay operated switch 235 having an actuating solenoid 236. The solenoid 232 is connectable across the power source by a conductor 237 and start switch 238. A holding circuit is established by the switch 239 and conductor 240 through the normally closed stop switch 241. The solenoids 234 and 236 are connected in parallel by conductors 242 and 243 and the conductor 242 is permanently connected to one side of the power source at 244. The conductor 243 is connected through a conductor 245 and emergency stop switch 246 to a normally closed stop switch 247. The switch 247 is in turn connected to a normally open start switch 248 to complete the initial circuit.

A holding circuit is established by the switch 233 through the conductor 249 to a normally closed inching switch 250 to the stop switch 247.

The rack bars 147 are actuated by energization of the solenoids 149. The solenoids 149 are energized by closing of switch 251 and switch 251 is controlled by solenoid 252. The energizing circuit of the solenoid 252 includes the previously described control switch 126 that is operated by the cam 123 (see Fig. 9).

The motor 183 that operates the mat shear blade 197 and the final fabric feeding jaws 166 is connectable across the power source by a relay operated switch 253 having an actuating solenoid 254. The solenoid 254 is connectable across the power source by a conductor 255 extending through a second emergency stop switch 256 to a stop switch 257. The stop switch 257 connects to one side of a normally open start switch 258 and a normally closed inching switch 259. The inching switch is in turn connected to one side of the power lead to the motor 183 as at 260 as a holding circuit. Closing of the start switch 258 obviously energizes the relay 254 to start the motor 183 and close the holding circuit at 260.

The solenoid 186 which actuates the clutch connection between the shear operating crank wheel 187 and the motor 183 is connected across the power leads to the motor 183 to be controlled by the solenoid 254. The solenoid 186 is further controlled by a selective pair of branch circuits 261 and 262. A switch for selecting one or the other of these circuits is indicated at 263. The circuit 262 includes the switch 202 operated by the cross head 167. The circuit 261 includes a manual switch 264. Connected in series with both of the circuits 262 and 261 is a cam operated switch 265 operated by a cam 266 on the control shaft 177 in timed relation to the mat feeding grippers 166. The circuit 262 thus provides automatic operation of the shear blade 197 at a predetermined point in the cycle of operation of control shaft 177 while circuit 261 requires manual operation of a switch 264 to actuate the cut off shear. The control shaft 177 is driven at adjustable speed by the hydraulic transmission 180 from the motor 183 as previously described and each revolution of the shaft 177 trips the switch to energize the solenoid clutch 186. The solenoid clutch 186 provides a one revolution driving connection between the motor 183 and the shear operating mechanism and the cam 266 is angularly arranged on the shaft 177 to initiate operation of the shear at a time when the gripper jaws 168, which are driven by the shaft 177, are in advanced position.

The disconnect solenoid 209 which disconnects the control shaft 177 from the motor 183 by shifting the throw out gear 203 is connected across the power leads to the motor 183 by a circuit 267 including a manual control switch 268. A parallel disconnect circuit 269 includes a switch 270 operated by a cam 271 on the shaft 177 and a switch 272 operated by a cam 273 on the shear operating crank 193 (see Fig. 17). The cam 273 is arranged to close the circuit 269 only in the fully raised positions of the shear 197 while the cam 271 is arranged to close the circuit in all positions of the shaft 177 except the proper shear actuating position of cam 266. Thus the circuit 269 is usually open when cam 266 trips the shear depressing mechanism but should the shear be tripped at the improper time by some maladjustment with the switch 270 closed, the switch 272 would immediately close and energize the solenoid 209 to throw out the clutch driving the shaft 177. The shear would complete one improper operation but the machine would not continue to operate in its maladjusted condition.

We have thus described a highly practical form of our mat forming machine but it should be understood that our invention is not limited to the specific details of the disclosure as many modifications of the structure may be made which will follow within the spirit of the invention as defined in the following claims.

Having thus described our invention, what we believe to be new and desire to secure by Letters Patent is:

1. A machine for manufacturing reinforced fabric comprising, feed rolls adapted to advance a web of fabric and having a variable speed transmission connected to drive the rolls, a weight biased guide roller suspended in a loop of the web delivered from said feed rolls, control linkage connected between said weight biased guide and said transmission to accelerate the transmission when said biased guide is lifted by shortening of said loop, a reinforcing strand applying mechanism positioned to receive the web from said weight biased guide and having an independent source of power, a control shaft driven by said independent source, reinforcing strand feed rolls associated with said mechanism and driven from said source, a cam on said control shaft engageable with a lever connected to said strand feeding rolls to render said rolls inoperative during a portion of the cycle of said shaft, a sequence wheel driven in step by step fashion by a crank connected to said shaft, a cam driven by said sequence wheel and engageable with an interrupter crank, said crank having an arm swingable into feed interrupting engagement with said feed roll actuating lever, a cam operated switch positioned to be actuated and opened at one point in the cycle of said sequence wheel, a conveyor positioned to receive and support the reinforced web issuing from said mechanism and having lugs engageable with reinforcing strands secured to the web to advance the web, means for feeding flexible border strands along the sides of said web, said mechanism including structure for tying the ends of each reinforcing strand to said border strands, cutters longitudinally adjustably mounted along the sides of said web forwardly of said conveyor, electrically actuated solenoid means mechanically connected to said cutters and electrically connected to said switch to be actuated thereby to cut out a length of said border strands, a web feeding roll connected to advance said web and the reinforcing strands carried thereby from said conveyor and delivering to a second loop, a control arm weight biased into said second loop, a table positioned to support the web delivered from said second loop, a reciprocating cross head having jaws retractable with said cross head to engage reinforcing strands of the web on said table and advance a length of the web thereacross, a driving motor adjustably connected to oscillate said cross head through a stroke corresponding to the length of mat to be formed, a cutting head positioned to sever mats from the end of said web and connected to be driven by said motor, a support for said cross head and said jaws vertically adjustable to elevate the jaws above said table, means connected to said motor and to said cross head support to actuate the latter in timed relationship with said cutting head, a variable speed device connected between said cross head and said motor, said control arm being connected to actuate said last variable speed device, and means for supporting mats severed from said web.

2. A machine for manufacturing reinforced fabric comprising, feed rolls adapted to advance a web of fabric and having a variable speed transmission connected to drive the rolls, a weight biased guide roller suspended in a loop of the web delivered from said feed rolls, control linkage connected between said weight biased guide and said transmission to accelerate the transmission when said biased guide is lifted by shortening of said loop, a reinforcing strand applying mechanism positioned to receive the web from said weight biased guide and having an independent source of power, a control shaft driven by said independent source, reinforcing strand feed rolls associated with said mechanism and driven from said source, a cam on said control shaft engageable with a lever connected to said strand feeding rolls to render said rolls inoperative during a portion of the cycle of said shaft, a sequence wheel driven in step by step fashion by a crank connected to said shaft, a cam driven by said sequence wheel and engageable with an interrupter crank, said crank having an arm swingable into feed interrupting engagement with said feed roll actuating lever, a conveyor positioned to receive and support the reinforced web issuing from said mechanism and having lugs engageable with reinforcing strands secured to the web to advance the web, a web feeding roll connected to advance said web and the reinforcing strands carried thereby from said conveyor and delivering to a second loop, a control arm weight biased into said second loop, a table positioned to support the web delivered from said second loop, a reciprocating cross head having jaws retractable with said cross head to engage reinforcing strands of the web on said table and advance a length of the web thereacross, a driving motor adjustably connected to oscillate said cross head through a stroke corresponding to the length of mat to be formed, a cutting head positioned to sever mats from the end of said web and connected to be driven by said motor, a support for said cross head and said jaws vertically adjustable to elevate the jaws above said table, means connected to said motor and to said cross head support to actuate the latter in timed relationship with said cutting head, a variable speed device connected between said cross head and said motor, said second control arm being connected to actuate said last variable speed device, and means for supporting mats severed from said web.

3. A machine for manufacturing reinforced fabric comprising, feed rolls adapted to advance a web of fabric and having a variable speed transmission connected to drive the rolls, a biased guide suspended in a loop of the web delivered from said feed rolls, control means connected between said guide and said transmission to accelerate the transmission when said guide is lifted by shortening of said loop, a reinforcing strand applying mechanism positioned to receive the web from said loop and having an independent source of power, a control shaft driven by said independent source, reinforcing strand feed rolls associated with said mechanism and driven from said source, a cam on said control shaft engageable with a lever connected to said strand feeding rolls to render said rolls inoperative during a portion of the cycle of said shaft, a sequence wheel driven in step by step fashion by a crank connected to said shaft, a cam driven by said sequence wheel and engageable with an interrupter crank, said crank having an arm swingable into feed interrupting engagement with said feed roll actuating lever, a pair of cam operated switches positioned to be actuated in timed relation in the cycle of said sequence wheel, a conveyor positioned to receive and support the reinforced web issuing from said mechanism and having lugs engageable with reinforcing strands secured to the web to advance the web, means for feeding flexible border strands along the sides of said web, said mechanism including structure for tying the ends of each reinforcing strand to said border strands, a ratchet wheel connected to advance said conveyor, a ratchet lever having a pawl drivingly engageable with said ratchet wheel, linkage connected to oscillate said ratchet lever and cam and operated in timed relation with control shaft, a blocking lever swingable into blocking engagement with said linkage to limit retracting motion of said linkage and pawl, a solenoid connected to actuate said blocking lever and connected to be energized by one of said pair of switches, cutters longitudinally adjustably mounted along the sides of said web forwardly of said mechanism, electrically actuated means mechanically connected to said cutters and electrically connected to the other of said pair of switches to be actuated thereby to cut out a length of said border strands, a web feeding roll connected to advance said web and the reinforcing strands carried thereby from said conveyor and delivering to a second loop, a control arm biased into said second loop, a table positioned to support the web delivered from said second loop, means for advancing the reinforced web across said table, a driving motor adjustably connected to operate said last means through a distance corresponding to the length of mat to be formed, a cutting head positioned to sever mats from the end of said web and connected to be driven by said motor, a variable speed device connected between said last means and said motor, said control arm being connected to actuate said last variable speed device, and means for supporting mats severed from said web.

4. A machine for manufacturing reinforced fabric comprising, feed rolls adapted to advance a web of fabric and having a variable speed transmission connected to drive the rolls, a biased guide suspended in a loop of the web delivered from said feed rolls, control means connected between said guide and said transmission to accelerate the transmission when said guide is lifted by shortening of said loop, a reinforcing strand applying mechanism positioned to receive the web from said loop and having an independent source of power, a control shaft driven by said independent source, reinforcing strand feed rolls associated with said mechanism and driven from said source, a cam on said control shaft engageable with a lever connected to said strand feeding rolls to render said rolls inoperative during a portion of the cycle of said shaft, a sequence wheel driven in step by step fashion by a crank connected to said shaft, a cam driven by said sequence wheel and engageable with an interrupter crank, said crank having an arm swingable into feed interrupting engagement with said feed roll actuating lever, a conveyor positioned to receive and support the reinforced web issuing from said mechanism and having lugs engageable with reinforcing strands secured to the web to advance the web, a ratchet wheel connected to advance said conveyor, a ratchet lever having a pawl drivingly engageable with said ratchet wheel, linkage connected to said ratchet lever to oscillate the same and cam actuated in timed relation with said control shaft, a blocking lever swingable into blocking engagement with said linkage to limit retraction of said linkage and pawl, a solenoid mechanically connected to actuate said blocking lever, a switch electrically connected to control said solenoid, a spacing control cam driven by said control shaft, said switch being located to be actuated by said spacing control cam, a web feeding roll connected to advance said web and the reinforcing strands carried thereby from said conveyor and delivering to a second loop, a control arm biased into said second loop, a table positioned to support the web delivered from said second loop, means for advancing the reinforced web across said table, a driving motor adjustably connected to operate said last means through a distance corresponding to the length of mat to be formed, a cutting head positioned to sever mats from the end of said web and connected to be driven by said motor, a variable speed device connected between said last means and said motor, said control arm being connected to actuate said last variable speed device, and means for supporting mats severed from said web.

5. A machine for manufacturing reinforced fabric comprising, feed rolls adapted to advance a web of fabric and having a variable speed transmission connected to drive the rolls, a biased guide suspended in a loop of the web delivered from said feed rolls, control means connected between said guide and said transmission to accelerate the transmission when said guide is lifted by shortening of said loop, a reinforcing strand applying mechanism positioned to receive the web from said guide and having an independent source of power, a control shaft driven by said independent source, reinforcing strand feed rolls associated with said mechanism and driven from said source, movable means connected to said feed rolls to render the same inoperative, a sequence wheel driven in step by step fashion by a crank connected to said shaft, a cam driven by said sequence wheel, means engageable between said cam and said movable means to hold said feed rolls in inoperative position, means positioned to receive and support the reinforced web issuing from said mechanism, means for feeding flexible border strands along the sides of said web, said mechanism including structure for tying the ends of each reinforcing strand to said border strands, a web feeding roll connected to advance said web and the reinforcing strands carried thereby from said mechanism and delivering to a second loop, a control arm biased into said second loop, a table positioned to support the web delivered from said second loop, a brake shoe coacting with said table to prevent retracting movement of the web thereover, a reciprocating cross head having jaws retractable with said cross head to engage reinforcing strands of the web on said table, a driving motor adjustably connected to oscillate said cross head through a stroke corresponding to the length of mat to be formed, a cutting head positioned to sever mats from the ends of said web and connected to be driven by said motor, a support for said cross head and said jaws vertically adjustable to elevate the jaws above said table, means connected to said motor and to said cross head supporting means to actuate the latter in timed relationship with said cutting head, a variable speed device connected between said cross head and said motor, said control arm being connected to actuate said last variable speed device, and means for supporting mats severed from said web.

6. A machine for manufacturing reinforced fabric comprising, feed rolls adapted to advance a web of fabric, a reinforcing strand applying mechanism positioned to receive the web from said feed rolls and having an independent source of power, a control shaft driven by said independent source, reinforcing strand feed rolls associated with said mechanism and driven from said source, movable means connected to said feed rolls to render the same inoperative, a sequence wheel driven in step by step fashion by a crank connected to said shaft, a cam driven by said sequence wheel, means engageable between said cam and said movable means to hold said feed rolls in inoperative position, means positioned to receive and support the reinforced web issuing from said mechanism, means for feeding flexible border strands along the sides of said web, said mechanism including structure for tying the ends of each reinforming strand to said border strands, a web feeding roll connected to advance said web and the reinforcing strands carried thereby from said mechanism and delivery to a loop, a control arm biased into said loop, a table positioned to support the web delivered from said loop, a brake shoe coacting with said table to prevent retracting movement of the web thereover, a reciprocating cross head having jaws retractable with said cross head to engage reinforcing strands of the web on said table, a driving motor adjustably connected to oscillate said cross head through a stroke corresponding to the length of mat to be formed, a cuttin head positioned to sever mats from the ends of said web and connected to be driven by said motor, a variable speed device connected between said cross head and said motor, said control arm being connected to actuate said last variable speed device, and means for supporting mats severed from said web.

7. In a machine for reinforcing a fabric web with wire strands, forming members having intermeshing portions adapted to form longitudinal flutes in said web, feed rolls adapted to project a reinforcing strand through said flutes, a drive shaft, a movable support for one of said feed rolls and biased to move the roll into operative strand feeding relation with the other roll, a driving connection between said shaft and said support adapted to retract said support and one roll in timed relation with said shaft, a ratchet wheel on said machine, a ratchet arm coacting with said ratchet wheel and having an adjustable driving oscillating connection to said shaft, a cam driven by said ratchet wheel, an interrupter lever movable by said cam and swingable thereby into blocking engagement with the connection between said shaft and said support to hold said one roll in inoperative position, a second cam driven in timed relation with said ratchet wheel, an electrical switch associated with said second cam to be actuated thereby, means delivering flexible border strands longitudinally along the sides of said web, means driven from said shaft in timed relation to wrap the ends of said reinforcing strands around said border strands, means including a conveyor driven in step by step timed relationship by said shaft and having lugs upstanding along one reach to engage the reinforcing strands attached to said web for advancing said web with said reinforcing strands and border strands attached thereto, electrically operated knives positioned alongside said web forwardly of said conveyor to cut away lengths of said border strands, said knives being electrically connected to said switch to be actuated thereby, an oscillatable driving connection between said shaft and said conveyor, a blocking member swingable into blocking engagement with part of said last driving connection to prevent full stroke operation thereof, a solenoid mechanically connected to actuate said blocking member, a spacing control cam driven from said shaft, and a second switch positioned to be actuated by said spacing control cam and electrically connected to regulate said solenoid.

8. In a machine for reinforcing a fabric web with wire strands, forming members having intermeshing portions adapted to form longitudinal flutes in said web, feed rolls adapted to project a strand through said flutes, a drive shaft, a movable support for one of said feed rolls and biased to move the roll into operative strand feeding relation with the other roll, a driving connection between said shaft and said support adapted to retract said one roll in timed relation with said shaft, a ratchet wheel on said machine, a ratchet arm coacting with said ratchet wheel and having a driving oscillating connection to said shaft, a cam driven by said ratchet wheel, an interrupter lever movable by said cam and swingable thereby into blocking engagement with the connection between said shaft and said support to hold said one roll in inoperative position, a second cam driven in timed relation with said ratchet wheel, an electrical switch associated with said second cam to be actuated thereby, means delivering flexible border strands longitudinally along the sides of said web, means driven from said shaft in timed relation to said shaft to wrap the ends of said reinforcing strands around said border strands, means for advancing said web with said reinforcing strands and border strands attached thereto, and electrically actuated knives positioned alongside said web forwardly of said strand connecting structure to cut away lengths of said border strands, said knives being electrically connected to said switch to be actuated thereby.

9. In a machine for reinforcing a fabric web with wire strands, forming members having intermeshing portions adapted to form longitudinal flutes in said web, feed rolls adapted to project a strand through said flutes, a drive shaft, a movable support for one of said feed rolls and biased to move the roll into operative strand feeding relation with the other roll, a driving connection between said shaft and said support adapted to retract said one roll in timed relation with said shaft, a ratchet wheel on said machine, a ratchet arm coacting with said ratchet wheel and having a driving oscillating connection to said shaft, a cam driven by said ratchet wheel, an interrupter lever movable by said cam and swingable thereby into blocking engagement with the connection between said shaft and said support to hold said one roll in inoperative position, means delivering flexible border strands longitudinally along the sides of said web, means driven from said shaft in timed relation to wrap the ends of said reinforcing strands around said border strands, and means for advancing said web with said reinforcing strands and border strands attached thereto in step by step timed relation to said shaft.

In a machine for reinforcing a fabric web with wire strands, forming members having intermeshing portions adapted to form longitudinal flues in said web, feed rolls adapted to project a strand through said flutes, a drive shaft, a movable support for one of said feed rolls and biased to move the roll into operative strand feeding relation with the other roll, a driving connection between said shaft and said support adapted to retract said one roll in timed relation with said members, a sequence wheel on said machine, means driven from said shaft and coacting with said wheel and having an intermittent driving connection therewith, a replaceable cam driven by said wheel, an interrupter lever movable by said cam and swingable thereby into blocking engagement with the connection between said shaft and said support to hold said one roll in inoperative position, and means including a conveyor driven in step by step timed relationship by said shaft and having lugs upstanding along one reach to engage the reinforcing strands attached to said web for advancing said web with said reinforcing strands attached thereto.

11. In a machine for reinforcing a fabric web with wire strands, forming members having intermeshing portions adapted to form longitudinal flutes in said web, feed rolls adapted to project a strand through said flutes, a drive shaft, means for rendering said feed rolls inoperative, a sequence wheel on said machine, means driven from said shaft and coacting with said wheel and having an intermittent driving connection therewith, a replaceable cam driven by said wheel, an interrupter member movable by said cam into blocking engagement with said means for rendering said feed rolls inoperative to actuate the same, means driven in step by step timed relationship by said shaft for advancing said web with said reinforcing strands attached thereto, said web advancing means including a spring retracted and cam advanced ratchet drive rod, a blocking lever movable into blocking engagement with said rod to limit retracting motion thereof, electrically actuated means connected to actuate said blocking levers, and a switch operated in timed relation by said sequence wheel and connected to said electrically actuated means to control the same.

12. A machine for manufacturing reinforced fabric comprising, means adapted to advance a web of fabric, a reinforcing strand applying mechanism positioned to receive the web from said first means and having an independent source of power, a control shaft driven by said independent source, reinforcing strand feed means associated with said mechanism and driven from said source, movable means connected to said strand feed means to render the same inoperative, a sequence wheel driven in step by step fashion by a crank connected to said shaft, a cam driven by said sequence wheel, means engageable between said cam and said movable means to hold said strand feed means in inoperative position, means positioned to receive and support the reinforced web issuing from said mechanism, means for delivering flexible border strands to the sides of said web, said mechanism including structure for tying the ends of each reinforcing strand to said border strands, a switch actuated in timed relation to said wheel, and shear means positioned ahead of said applying mechanism and adapted to cut away sections of said border strands, said shear means being electrically connected to said switch to be actuated thereby.

13. A machine for manufacturing reinforced fabric comprising a reinforcing strand applying mechanism having an independent source of power, a control shaft driven by said independent source, reinforcing strand feed means associated with said mechanism and driven from said source, movable mean connected to said strand feed means to render the same inoperative, a sequence wheel driven in step by step fashion by said shaft, a pair of cams driven by said sequence wheel, means engageable between one of said cams and said movable means to hold said strand feed means in inoperative position, means positioned to receive and support the reinforced web issuing from said mechanism, means for delivering flexible border strands to the sides of said web, said mechanism including structure for tying the ends of each reinforcing strand to said border strands, a switch actuated in timed relation to said wheel, shear means positioned ahead of said applying mechanism and adapted to cut away sections of said border strands, said shear means being electrically connected to said switch to be actuated thereby, web advancing means driven in step by step fashion by said shaft, means for limiting the advancing motion of said web advancing means, electrically operated means connected to actuate said limiting means, and a switch positioned to be actuated by the other of said cams and connected to control said electrically operated means.

14. A machine for manufacturing reinforced fabric comprising, means adapted to advance a web of fabric and having a variable speed transmission connected to drive the same, a biased guide suspended in a loop of the web delivered from said means, a control means connected between said guide and said transmission to accelerate the transmission when said guide is lifted by shortening of said loop, a reinforcing strand applying mechanism positioned to receive the web from said guide and having an independent source of power, a control shaft driven by said independent source, reinforcing strand feed means associated with said mechanism and driven from said source, movable means connected to said feed means to render the same inoperative, a sequence wheel driven in step by step fashion by said shaft, a cam driven by said sequence wheel, means engageable between said cam and said movable means to hold said feed means in inoperative position, means positioned to receive and support the reinforced web issuing from said mechanism, means for delivering flexible border strands to the sides of said web, said mechanism including structure for tying the ends of each reinforcing strand to said border strands, a switch positioned to be actuated in timed relation to said wheel, shear means positioned to sever lengths of said border strands from between reinforcing strands and connected to be actuated by said switch, means connected to advance said web and the reinforcing strands carried thereby from said mechanism and delivering to a second loop, a control arm biased into said second loop, a table positioned to support the web delivered from said second loop, a brake shoe coacting with said table to prevent retracting movement of the web thereover, a reciprocating cross head having jaws retractable with said cross head to engage reinforcing strands of the web on said table, a driving motor adjustably connected to oscillate said cross head through a stroke corresponding to the length of mat to be formed, a cutting head positioned to sever mats from the ends of said web and connected to be driven by said motor, a variable speed device connected between said cross head and said motor, said control arm being connected to actuate said last variable speed device, and means for supporting mats severed from said web.

15. A machine for manufacturing reinforced fabric comprising, a reinforcing strand applying mechanism having intermittently operating strand weaving structure and an independent source of power, a control shaft driven in step by step fashion by said independent source, a cam on said control shaft engageable with a member connected to said strand weaving structure to render said structure inoperative, a conveyor positioned to receive and support the reinforced web issuing from said mechanism and having lugs engageable with reinforcing strands secured to the web to advance the web, a driving connection between said source of power and said conveyor for intermittently driving said conveyor, control means engageable with said driving connection to limit the driving motion thereof, and electrically operated means including a switch positioned to be operated in timed relation with said cam and connected to actuate said control means.

16. A machine adapted to advance and sever mats from the end of a web of fabric having reinforcing wire strands woven transversely therethrough comprising, a table to receive said web, longitudinal guides positioned forwardly from the sides of said table and pivotally supported at their forward ends, a cross head slidable on said guides and having rearwardly extending jaws with longitudinally spaced depending lugs adapted to engage behind strands in said web when said jaws are retracted over said table, shear means reciprocable across the forward end of said table to sever a mat from said web, a motor, means including an electrically actuated clutch drivingly connecting said motor to said shear means, a cam shaft driven from said motor independently of said clutch, a lever having a fixed pivot and connected at its swinging end to said head to reciprocate the same, a first cam on said shaft, adjustable means engaged between said lever and said first cam to actuate said head through variable strokes, a rock shaft link connected to said guides to raise and lower the rear end of the same, a second cam on said shaft, means operatively connecting said rock shaft to said second cam for actuation thereby to raise said guides on the retracting stroke of said head, a third cam on said shaft, a switch positioned to be actuated by said third cam and connected to said clutch to actuate the same and said shear when said head is fully advanced, and a support for severed mats disposed forwardly of said shear and table and below said head.

17. A machine adapted to advance and sever mats from the end of a web of fabric having reinforcing wire strands woven transversely therethrough comprising, a table to receive said web, longitudinal guides positioned forwardly from said table and pivotally supported at their forward ends, a cross head slidable on said guides and having rearwardly extending jaws with depending lugs adapted to engage behind strands in said web when said jaws are retracted over said table, shear means reciprocable across the forward end of said table to sever a mat from said web, a motor, means including an electrically actuated clutch drivingly connecting said motor to said shear means, a cam shaft driven from said motor independently of said clutch, a lever having a fixed pivot and connected at its swinging end to said head to reciprocate the same, a first cam on said shaft, adjustable means engaged between said lever and said first cam to actuate said head through variable strokes, a rock shaft connected to said guides to raise and lower the rear end of the same, a second cam on said shaft, means operatively connecting said rock shaft to said second cam for actuation thereby to raise said guides on the retracting stroke of said head, a third cam on said shaft, a switch positioned to be activated by said third cam and connected to said clutch to actuate the same and said shear when said head is fully advanced, and a support for severed mats disposed forwardly of said shear and table and below said head.

18. A machine for making reinforced fabric mats comprising, a device adapted to advance a fabric web in step by step fashion and weave a wire strand transversely across the web while the web is stationary, a mat cutoff apparatus positioned to receive the web from said device, said apparatus including a web receiving table with a one way clutching element engageable with the web at transversely disposed positions thereacross to prevent retraction thereof, an intermittently operating feed element engageable with said web at transversely disposed positions thereacross operative to advance a mat length of said web from said clutching element in a single advancing motion, and a shear element operated in timed relation with said feed element to sever said web and form a mat.

19. A machine for manufacturing a reinforced fabric comprising a feed roll for a web of fabric, a variable speed driving means for said feed roll, a control means for said variable speed feed roll driving means comprising an element suspended in a loop of the web at the rear of said feed roll means acting to form a plurality of spaced offsets in the web and supporting the fabric at the offsets, means for feeding reinforcing strands through the offset portions of the fabric while they are so supported and while the web is at rest, means for supporting longitudinal tie members adjacent the ends of the strands, means for wrapping the ends of the strands around the tie members while the tie members are so supported, means for controlling the feeding of the strands whereby a plurality of strands are interwoven with the fabric in uniformly spaced relation and for interrupting such feeding for a predetermined period to produce spaced strand reinforced sections, feed means for the reinforced fabric comprising a plurality of laterally spaced intermittently driven feed chains having parallel reaches disposed at the rear of said strand interweaving means, said chains being provided with flights engageable with the strands to translate the reinforced web and to advance the web of fabric step by step through the strand weaving station, holddown bars resting upon the fabric above said feed chains, and spaced pairs of cutters for said longitudinal tie members timed with the actuation of said strand feeding means to cut out lengths of the longitudinal tie member beween the spaced reinforced sections.

20. A machine for manufacturing a reinforced fabric comprising a feed roll for a web of fabric, a variable speed driving means for said feed roll, a control means for said variable speed feed roll driving means comprising an element suspended in a loop of the web at the rear of said feed roll means acting to form a plurality of spaced offsets in the web and supporting the fabric at the offsets, means for feeding reinforcing strands through the offset portions of the fabric while they are so supported and while the web is at rest, feed means for the reinforced fabric comprising a plurality of laterally spaced intermittently driven feed chains having parallel reaches disposed at the rear of said strand interweaving means, said chains being provided with flights engageable with the strands to translate the reinforced web and to advance the web of fabric step by step through the strand weaving station, and holddown bars resting upon the fabric above said feed chains.

21. A machine for manufacturing a reinforced fabric comprising means acting to form a plurality of spaced offsets in a web of fabric and supporting the fabric at the offsets, means for feeding reinforcing strands through the offset portions of the fabric while they are so supported and while the web is at rest, means for supporting longitudinal tie members adjacent the ends of the strands, means for wrapping the ends of the strands around the tie members while the tie members are so supported, means for controlling the feeding of the strands whereby a plurality of strands are interwoven with the fabric in uniformly spaced relation and for interrupting such feeding for a predetermined period to produce spaced strand reinforced sections, feed means for the reinforced fabric comprising a plurality of laterally spaced intermittently driven feed chains having parallel reaches disposed at the rear of said strand inserting means, said chains being provided with flights engageable with the strands to translate the reinforced web and to advance the web of fabric step by step through the strand weaving station, and holddown bars resting upon the fabric above said feed chains, and spaced pairs of cutters for said longitudinal tie members timed with the actuation of said strand feeding means to cut out lengths of the longitudinal tie member between the spaced reinforced sections.

22. A machine for manufacturing a reinforced fabric comprising means acting to form a plurality of spaced offsets in the web and supporting the fabric at the offsets, means for feeding reinforcing strands through the offset portions of the fabric while they are so supported and while the web is at rest, means for supporting longitudinal tie members adjacent the ends of the strands, means for wrapping the ends of the strands around the tie members while the tie members are so supported, means for controlling the feeding of the strands whereby a plurality of strands are interwoven with the fabric in uniformly spaced relation and for interrupting such feeding for a predetermined period to produce spaced strand reinforced sections, means for advancing the reinformed fabric step by step through the strand weaving station, and spaced pairs of cutters for said longitudinal tie members timed with the actuation of said strand feeding means to cut out lengths of the longitudinal tie member between the spaced reinforced sections.

23. A machine for manufacturing mats comprising a web of fabric and spaced parallel resilient strands woven transversely therethrough, comprising means acting to form a plurality of spaced offsets in a web of fabric and supporting the fabric at the offsets, means for feeding the reinforcing strands through the offset portions of the fabric while they are so supported, means for controlling the feeding of the strands whereby a plurality of the strands are interwoven with the fabric in uniformly spaced relation and for interrupting such feeding for predetermined periods to produce strand reinforced mat sections having unreinforced portions of the fabric at the ends thereof a supporting table for the reinforced web of fabric, a shear bar disposed at the front of the table, a cutter coacting with said shear bar, a detent disposed in opposed relation to the table to engage the reinforced fabric preventing retracting movement thereof on the table, yieldable holddown shoes engaging the reinforced fabric upon the table closely adjacent to the shear bar, reciprocatingly mounted feed jaws adapted to engage reinforcing strands for translating mat lengths of the web across the table in a single continuous advancing motion, said jaws at the rear ends of their stroke engaging strands of the web supported by the table and at the rear of the cutter, and means for actuating the shear bar and said feed jaws in timed relation to sever the web between mat sections thereof.

24. A machine for manufacturing mats comprising a web of fabric and spaced parallel resilient strands woven transversely therethrough, comprising means acting to form a plurality of spaced offsets in a web of fabric and supporting the fabric at the offsets, means for feeding the reinforcing strands through the offset portions of the fabric while they are so supported, means for controlling the feeding of the strands whereby a plurality of the strands are interwoven with the fabric in uniformly spaced relation and for interrupting such feeding for predetermined periods to produce strand reinforced mat sections having unreinforced portions of the fabric at the ends thereof, a supporting table for the reinforced web of fabric, a shear bar disposed at the front of the table, a cutter coacting with said shear bar, reciprocatingly mounted feed jaws adapted to engage reinforcing strands for translating mat lengths of the web across the table in a single continuous advancing motion, said jaws at the rear ends of their stroke engaging strands of the web supported by the table and at the rear of the cutter, and means for actuating the shear bar and said feed jaws in timed relation to sever the web between mat sections thereof.

25. In a machine for manufacturing mats comprising a web of fabric and spaced reinforcing strands woven transversely therethrough, the combination of a supporting table for the reinforced web of fabric, a shear bar disposed at the front of the table, a cutter coacting with said shear bar, a detent disposed in opposed relation to the table to engage a strand of the reinforced fabric at transversely disposed positions thereacross preventing retracting movement thereof on the table, yieldable shoes acting to apply yielding resistance to the translation of the web at transversely disposed positions thereacross and engaging the reinforced fabric upon the table closely adjacent to the shear bar, reciprocatingly mounted feed jaws engageable with reinforcing strands at transversely disposed positions thereacross for translating a mat length of the reinforced web across the table at each stroke, teeth on said jaws at the rear ends of their stroke engaging strands of the web supported by the table and at the rear of the cutter, and means for actuating the cutter and said feed jaws in timed relation to sever the web between mat sections thereof.

26. In a machine for manufacturing mats comprising a web of fabric and spaced reinforcing strands woven transversely therethrough, the combination of a supporting table for the reinforced web of fabric, a shear bar disposed at the front of the table, a cutter coacting with said shear bar, reciprocatingly mounted feed jaws engageable with reinforcing strands at transversely disposed positions thereacross for translating a mat length of the reinforced web across the table at each stroke, teeth on said jaws at the rear ends of their stroke engaging strands of the web supported by the table and at the rear of the cutter, and means for actuating the cutter and said feed jaws in timed relation to sever the web between mat sections thereof.

27. A machine for cutting individual mats from the end of a web of fabric having stiff reinforcing strands woven transversely therethrough at longitudinally spaced intervals comprising, a cross head reciprocable longitudinally of said web and having transversely spaced grippers with forwardly facing depending jaws mounted thereon to retract over the end of said web and engage the reinforcing strands therein, a support for said web, a shear reciprocable across the end of said support to cut said web, a support for said cross head and grippers, and a driving connection to said last support adapted to move the same in timed relation to said cross head to direct said jaws through a loop forwardly from the support for said web then rearwardly and upwardly and then downwardly onto the top of said web.

References Cited in the file of this patent
UNITED STATES PATENTS

| 1,044,454 | Harris | Nov. 12, 1912 |
| 1,423,798 | Hennessy | July 25, 1922 |
| 1,485,827 | Bull | Mar. 4, 1924 |
| 1,546,918 | Clarke | July 21, 1925 |

(Other references on following page)

UNITED STATES PATENTS

| | | |
|---|---|---|
| 1,625,403 | Stevens | Apr. 19, 1927 |
| 1,868,226 | Draher et al. | July 19, 1932 |
| 1,939,985 | Keech | Dec. 19, 1933 |
| 2,086,196 | Strickland et al. | July 6, 1937 |
| 2,143,147 | Ferris | Jan. 10, 1939 |
| 2,168,415 | Laukhuff | Aug. 8, 1939 |
| 2,218,749 | Heilman | Oct. 22, 1940 |
| 2,218,758 | Leal | Oct. 22, 1940 |
| 2,227,387 | Borton | Dec. 31, 1940 |
| 2,475,691 | Bonebrake | July 12, 1949 |
| 2,648,842 | Shockey | Aug. 18, 1953 |

FOREIGN PATENTS

| | | |
|---|---|---|
| 828,031 | France | May 9, 1938 |